US010269211B2

(12) United States Patent
Davidson et al.

(10) Patent No.: US 10,269,211 B2
(45) **Date of Patent: *Apr. 23, 2019**

(54) PLAYER-ENTRY ASSIGNMENT AND ORDERING

(71) Applicant: Rational FT Enterprises Limited, Onchan (IM)

(72) Inventors: John Aaron Davidson, Stillorgan (IR); Darse Raymond Billings, Dublin (IR)

(73) Assignee: RATIONAL FT ENTERPRISES LIMITED, Onchan (IM)

( * ) Notice: Subject to any disclaimer, the term of this patent is extended or adjusted under 35 U.S.C. 154(b) by 0 days.

This patent is subject to a terminal disclaimer.

(21) Appl. No.: 15/338,843

(22) Filed: Oct. 31, 2016

(65) Prior Publication Data

US 2017/0243437 A1 Aug. 24, 2017

Related U.S. Application Data

(63) Continuation of application No. 13/006,620, filed on Jan. 14, 2011, now Pat. No. 9,483,898.

(30) Foreign Application Priority Data

Jan. 19, 2010 (EP) .................................... 10250085

(51) Int. Cl.

| | |
|---|---|
| ***A63F 13/00*** | (2014.01) |
| ***G07F 17/32*** | (2006.01) |
| ***G06Q 90/00*** | (2006.01) |

(52) U.S. Cl.

CPC ......... *G07F 17/3237* (2013.01); *G06Q 90/00* (2013.01); *G07F 17/32* (2013.01); *G07F 17/3293* (2013.01)

(58) Field of Classification Search

CPC ............. G07F 17/3237; G07F 17/3241; G07F 17/3276; G07F 17/3293; A63F 2001/008

See application file for complete search history.

(56) References Cited

U.S. PATENT DOCUMENTS

| | | | |
|---|---|---|---|
| 5,752,702 | A | 5/1998 | McDoniel |
| 6,375,567 | B1 | 4/2002 | Acres |

(Continued)

FOREIGN PATENT DOCUMENTS

| | | | |
|---|---|---|---|
| CA | 2280194 | A1 | 2/2001 |
| EA | 004753 | B1 | 8/2004 |

(Continued)

OTHER PUBLICATIONS

Notification of Transmittal of the International Search Report and the Written Opinion of the International Search Authority, or the Declaration for PCT/IB2010/003383 (12 pages), dated Jul. 21, 2011.

(Continued)

*Primary Examiner* — David L Lewis
*Assistant Examiner* — Robert E Mosser
(74) *Attorney, Agent, or Firm* — BakerHostetler LLP

(57) ABSTRACT

A method of assigning a player-entry to a table so that said player-entry can participate in a hand of a particular card game at said table, wherein there is a plurality of players each having one or more respective player-entries for participating in a respective hand of said card game, wherein a player-entry that is actively participating in a hand of said card game may fold out of turn from said hand so as to no longer be actively participating in said hand, the method comprising: for a first player-entry of a first player, identifying an assignable table for said first player-entry from a plurality of tables for said card game, wherein a table is an assignable table for a particular player-entry if the assign- (Continued)

ment of said particular player-entry to said table cannot itself provide any player with further information about a hand in which an already assigned player-entry of said player is actively participating in addition to information about said hand that is available to said player only by virtue of the participation of said already assigned player-entry in said hand; and assigning the first player-entry to the identified assignable table.

12 Claims, 6 Drawing Sheets

(56) References Cited

U.S. PATENT DOCUMENTS

| | | | |
|---|---|---|---|
| 6,390,474 | B1 | 5/2002 | Terminel et al. |
| 6,416,407 | B1 | 7/2002 | Carrico et al. |
| 6,481,717 | B1 | 11/2002 | Richardelle |
| 6,575,831 | B1 | 6/2003 | Gonen et al. |
| 6,902,166 | B2 | 6/2005 | Stern |
| 2003/0070178 | A1 | 4/2003 | Boyd et al. |
| 2003/0073494 | A1 | 4/2003 | Kalpakian et al. |
| 2004/0017043 | A1 | 1/2004 | Moody |
| 2004/0036217 | A1 | 2/2004 | Schlumbrecht |
| 2004/0082384 | A1 | 4/2004 | Walker et al. |
| 2004/0132521 | A1 | 7/2004 | Peterson |
| 2004/0183254 | A1 | 9/2004 | Schlumbrecht |
| 2005/0116416 | A1 | 6/2005 | Peterson |
| 2005/0215300 | A1 | 9/2005 | Oliveras |
| 2007/0155460 | A1 | 7/2007 | Burnside et al. |
| 2008/0280663 | A1 | 11/2008 | Shar et al. |
| 2009/0189351 | A1 | 7/2009 | Baerlocher et al. |

FOREIGN PATENT DOCUMENTS

| | | | |
|---|---|---|---|
| WO | WO 1999/064128 | A1 | 12/1999 |
| WO | WO 2003/011407 | A1 | 2/2003 |
| WO | WO 2004/004853 | A2 | 1/2004 |
| WO | WO 2004/071601 | A2 | 8/2004 |
| WO | WO 2005/033825 | A2 | 4/2005 |
| WO | WO 2007/059310 | A2 | 5/2007 |
| WO | WO 2007/078372 | A2 | 7/2007 |
| WO | WO 2009/100582 | A1 | 8/2009 |

OTHER PUBLICATIONS

Communication/extended European search report for PCT/US2006/039086; 8 pages, dated Feb. 4, 2011.

U.S. Appl. No. 11/316,573; with drawings; 53 pages, filed Dec. 20, 2005.

Final Office Action for U.S. Appl. No. 11/316,573; 12 pages, dated Jun. 10, 2009.

Interview Summary for U.S. Appl. No. 11/316,573; 2 pages, dated Mar. 5, 2009.

Office Action for U.S. Appl. No. 11/316,573; 11 pages, dated Dec. 16, 2008.

Notification of Transmittal of the International Search Report and Written Opinion of the International Searching Authority, or the Declaration for PCT/US06/39086; 9 pages, dated Sep. 26, 2007.

Texas Hold 'em Rules; 2005 Interskill Games Limited; http://www.pokerstars.net/;games/how.sub.--to.sub.--play/texas.sub.--holdem.html;pp. 1-4, downloaded Dec. 20, 2005.

Omaha 8 Better Poker Game Rules; 2005 Interskill Games Limited; http://www.pokerstars.net/; games/how.sub.--to.sub.--play/omaha.sub.--8better.html;pp. 1-5, downloaded Dec. 20, 2005.

Seven Card Stud Poker Game Rules; 2005 Interskill Games Limited; http://www.pokerstars.net/; games/how.sub.--to.sub.--play/seven.sub.--card.sub.--stud.html;pp. 1-3, downloaded Dec. 20, 2005.

Seven Card Stud 8 or better Poker Game Rules; 2005 Interskill Games Limited; http://www.pokerstars.net/; games/how.sub.--to.sub.--play/stud.sub.--8.sub.--better.html;pp. 1-3, downloaded Dec. 20, 2005.

Information sheet; 2005 Interskill Games Limited; http://www.pokerstars.net/; 1 page, downloaded Dec. 20, 2005.

Information sheet; http://www.pokerstars.net/; 1 page, downloaded Dec. 20, 2005.

Response to the Examination Report issued by the UK Intellectual Property Office dated Apr. 27, 2011 for UK Patent Application No. 1022044.0, dated Mar. 19, 2012.

Response to Communication from the European Patent Office for European Patent Application No. 06836201.1 dated Sep. 21, 2011, dated Mar. 21, 2012.

Combined Search and Examination Report under Sections 17 and 18(3); IPO; Patents Directorate, South Wales for GB1022044.0; 8 pages, dated Apr. 27, 2011.

Communication from Government of Pakistan, IPO, Karachi—Examination Report; regarding Patent Application No. 19/2011 (2 pages), dated Aug. 22, 2011.

Communication Pursuant to Article 114(2) EPC for Application No. 06 836 201.1-2221—Observations by a third party for EP 1968720; (8 pages), dated Sep. 13, 2011.

Australian Government (IP Australia); Examiner's First Report on Patent Application No. 2006333559 (3 pages), dated Sep. 13, 2011.

Communication Pursuant to Article 94(3) EPC for Application No. 06 836 201.1-2221 (6 pages), dated Sep. 21, 2011.

IPO.UK; Intellectual Property Office South Wales; Search Report under Section 17/6 for Application No. GB1022044 ; (2 pages), dated Oct. 13, 2011.

Summons to Attend Oral Proceedings Pursuant to Rule 115(1) EPC for European Patent Application No. 06836201.1 dated Oct. 4, 2012, 7 sheets.

Response to Summons to Attend Oral Proceedings Pursuant to Rule 115(1) EPC for European Patent Application No. 06836201.1 dated Jan. 4, 2013, 9 sheets.

Result of Consultation by Telephone with the Applicant for European Patent Application No. 06836201.1 dated Feb. 6, 2013, 2 sheets.

Examination Report under Section 18(3) issued by the UK Intellectual Property Office dated Nov. 14, 2012 for UK Patent Application No. 1022044.0, 5 sheets.

EPO Communication along with extended European Search Report for European Patent Application No. 10250085.7, dated May 19, 2010, 5 sheets.

Reply to Written Opinion for European Patent Application No. 10250085.7, dated Jul. 3, 2012, 4 sheets.

EPO Communication pursuant to Article 94(3) EPC for European Patent Application No. 10250085.7, dated Aug. 30, 2012, 5 sheets.

Examination Report in UK Patent Application No. GB1022044.0, dated Jun. 12, 2013, 2 pages.

Written Decision to Refuse a European Patent Application for European Patent Application No. 06836201.1 dated Mar. 26, 2013, 16 sheets.

Screenshot of www.pokerstars.net/pokerbasics.html from Nov. 30, 2005 (R1 ), 1 page.

Screenshot of www.pokerstars.net/quicktour.html from Dec. 1, 2005 (R3), 2 pages.

"Third Party Protest Submission Under S. 34.1 of the Patent Act" filed in CA Appln. No. 02632291, dated Aug. 28, 2014, 36 pages.

GB Examination Report Under Section 18(3), issued in GB Patent Application No. GB102204.4.0, dated Mar. 31, 2014, 3 pages.

AU Patent Examination Report, issued in AU Patent Application No. 2010343698, dated Mar. 5, 2014, 4 pages.

CN Office Action, issued in CN Patent Application No. 201080065588.9, dated Feb. 19, 2014, 3 pages.

Office Action, issued in EA Patent Application No. 201290669/31, dated Jun. 6, 2014, 4 pages (with English translation).

TW Office Action issued in TW Appln. No. 100101858, dated Mar. 30, 2015, 13 pages.

PLAYER-ENTRY ASSIGNMENT AND ORDERING

RELATED APPLICATIONS

This Application is a Continuation Application of U.S. patent application Ser. No. 13/006,620, filed Jan. 14, 2011, which claims priority to European Application No. EP 10250085.7, filed Jan. 19, 2010, the disclosures of which are incorporated herein by reference in their entirety.

FIELD OF THE INVENTION

The present invention relates to a method of assigning a player-entry to a table and a method of determining an order in which a group of player-entries participate in a hand of a card game. The present invention also relates to apparatus arranged to carry out any such method and to computer programs which, when executed by a processor, carry out any such method.

BACKGROUND OF THE INVENTION

In a normal game of poker, people sit together at a table with a deck of cards. Each player takes a turn dealing the cards clockwise beginning at the left of the dealer until all players have a designated number of cards. The player to the left of the dealer who receives the first card will deal the next hand.

In professional games at card rooms, a separate person referred to as the “dealer” physically deals the cards, but he does not play. Since the deck resides with the stationary dealer, a round disk called a dealer’s button or simply the “button”, is placed in front of the player sitting in the dealer’s seat. The person on the button or dealer’s seat has an advantage, because he acts last on his hand, after the other players.

Many people are now playing poker on the Internet. A number of companies host games by having a website or URL, such as www.FullTiltPoker.com. The host sites generally offer a variety of games, and the number of players in a game will vary. The same type of game may be offered with a different maximum number of players. The lower the maximum number of players, the less the quality of the hand necessary to “call” and the faster the game. Where fifty-five hands an hour might be played in a nine player game, one hundred hands an hour might be played in a six player game.

A popular online poker game is Hold ’Em, and at times it comprises approximately eighty percent of the online games played. Four other popular games with a smaller percentage of the market include Four Card Omaha High, Four Card Omaha 8OB (high-low eight or better), Seven Card Stud High and Seven Card Stud 8OB. Other games comprise a smaller percentage of the market. The relative popularity of these and other games typically changes over time.

In poker games, it is possible for two or more people to play together in collusion (a form of cheating). To do this, the players may use signals designed to keep other players from discovering their scheme. Although Internet and other organizations providing electronic play do their best to eliminate collusion, it can be a major problem. In some cases an online poker player can play two hands at the same table under two different names. The cheater may login by dialing different servers using different login names. The servers may have different Internet or IP addresses, and there is no reliable method for identifying or tracking a person playing under two different names at the same table.

Besides collusion, another problem with poker play is boredom. Players typically respond serially in a clockwise fashion, each being forced to wait his turn, even if the player just intends to fold. Then, when a player’s turn comes and he folds, he has to wait for the hand to end before he becomes active again. In some cases, online poker sites attempt to allow players to remain more active by letting players play at more than one table at a time. To do this, a player may open a second window and play at two different tables at the same time. This activity, referred to as “multi-tabling” or “double dipping” in poker jargon, does afford a player more action by allowing him to play twice as many hands per hour. However, it is not seamless. There are frequent times when the player is idle at both tables, and there are times when he will need to respond concurrently at both tables.

SUMMARY OF THE INVENTION

According to a first aspect of the invention, there is provided a method of assigning a player-entry to a table so that said player-entry can participate in a hand of a particular card game at said table, wherein there is a plurality of players each having one or more respective player-entries for participating in a respective hand of said card game, wherein a player-entry that is actively participating in a hand of said card game may fold out of turn from said hand so as to no longer be actively participating in said hand, the method comprising: for a first player-entry of a first player, identifying an assignable table for said first player-entry from a plurality of tables for said card game, wherein a table is an assignable table for a particular player-entry if the assignment of said particular player-entry to said table cannot itself provide any player with further information about a hand in which an already assigned player-entry of said player is actively participating in addition to information about said hand that is available to said player only by virtue of the participation of said already assigned player-entry in said hand; and assigning the first player-entry to the identified assignable table. In other words, the assignment of a player-entry to a table should not allow any player to gain (via observing or participating in a hand or hands via their own player-entry or player-entries) additional information which may aid that player in their hand(s) (e.g. information about the activities of the now-assigned player-entry). The assignment of a player-entry to a table should not allow a player with a player-entry also assigned (or subsequently assigned) to that table to gain information about another hand in which that player is participating.

In one embodiment, the number of player-entries currently assigned to an assignable table is less than a threshold number required for participating in a hand of said card game. The step of identifying may then comprise identifying an assignable table for said first player-entry that has the largest number of player-entries currently assigned out of all of the assignable tables for said first player-entry.

In one embodiment, said further information identifies that said first player-entry has folded out of turn from said hand in which said already assigned player-entry is actively participating.

In one embodiment, when said first player-entry folded out of turn from the hand that said first player-entry most recently participated in, the step of identifying comprises determining that a particular table is not an assignable table for said first player-entry if a second player that has a player-entry still actively participating in said hand that said first player-entry most recently participated in also has a player-entry assigned to that particular table. In one embodiment, when there is a particular table to which a further player-entry has been assigned and said further player-entry folded out of turn from the hand that said further player-entry most recently participated in, said step of identifying comprises determining that said particular table is not an assignable table for said first player-entry if said first player has a second player-entry still actively participating in said hand that said further player-entry most recently participated in.

In one embodiment, the method comprises: if none of said plurality of tables is an assignable table for said first player-entry, adding a new table to said plurality of tables, said step of identifying then identifying said new table.

In one embodiment, the method comprises carrying out the steps of identifying and assigning for each player-entry of said plurality of players that is not currently assigned to a respective table. In one embodiment, the method comprises carrying out, at each of a sequence of time-points, the steps of identifying and assigning for each player-entry of said plurality of players that is not currently assigned to a respective table.

The method may comprise: at a time-point, identifying that at least one of said plurality of tables is a stalling table, wherein a table is a stalling table if the number of player-entries assigned to said table has, for a predetermined number of most recent time-points, been less than a threshold number required for participating in a hand of said card game; selecting a first table from said plurality of tables, wherein the number of player-entries currently assigned to said table is less than said threshold number by N player-entries, where N is a positive integer; identifying a stalling table having at least N player-entries currently assigned and for which said first table is an assignable table; and reassigning N player-entries of said at least N player-entries to said first table. Said step of selecting a first table may comprise selecting a first table from said plurality of tables that has a smallest respective value of N.

In one embodiment, the method comprises carrying out the steps of identifying and assigning for a player-entry that did not folded out of turn from the hand that that player-entry most recently participated in before carrying out the steps of identifying and assigning for a player-entry that did folded out of turn from the hand that that player-entry most recently participated in.

In one embodiment, the method comprises: before carrying out the steps of identifying and assigning, generating a list of constraints on the assignment of any currently unassigned player-entries; wherein the step of identifying uses said list of constraints to identify whether a table is an assignable table for said first player-entry.

According to a second aspect of the invention, there is provided a method for a player to participate in hand of a particular card game at a table, the method comprising the player participating in said hand using an access element, the access element being coupled to a gaming system via a network, the gaming system having assigned a player-entry of said player to said table by carrying out a method according to the above first aspect of the invention, said player participating in said hand of said particular card game at said table using said player-entry.

According to a third aspect of the invention, there is provided a method of determining an order in which a group of player-entries, from a plurality of player-entries, that have been assigned to a table to participate in a hand of a card game associated with said table take a turn in said hand, wherein said order is based, at least in part, on which player-entry of said group of player-entries assumes a particular role in said hand, the method comprising: for each player-entry of said plurality of player-entries, storing a respective counter that represents the number of hands in which that player-entry has participated since that player-entry last assumed said particular role; and selecting a player-entry out of said group of player-entries that has the highest respective counter to be the player-entry that assumes said particular role in said hand.

In one embodiment, the step of selecting is performed after the number of player-entries in said group of player-entries has reached a threshold number of player-entries required for participating in said hand of said card game. The method may then comprise: assigning player-entries to said table until the number of player-entries in said group of player-entries has reached said threshold number; and after the step of selecting, allowing said group of player-entries to participate in said hand of said card game. Said step of assigning may comprises carrying out a method according to the above first aspect of the invention.

In one embodiment, the method comprises setting the respective counter of a newly-created player-entry to a predetermined maximum value for said counter.

In one embodiment, said particular role determines which of said player-entries of said group of player-entries takes a first turn in said hand of said card game. In one embodiment, said particular role determines which of said player-entries of said group of player-entries takes a first turn in a round of said hand of said card game. In one embodiment, said particular role is one of a big blind, a small blind, or a dealer for said hand of said card game.

In one embodiment, said table has an associated cyclically ordered plurality of turn-positions each allocatable to a respective player-entry from said group of player-entries, wherein the method comprises: when a player-entry has been assigned to said table, randomly allocating to said player-entry a turn-position from any of said plurality of turn-positions that have not yet been allocated to a player-entry; wherein the relative order in which said group of player-entries take respective turns in said hand of said card game is determined by the cyclic ordering of said plurality of turn-positions and the allocations of said group of player-entries to said plurality of turn-positions.

According to a fourth aspect of the invention, there is provided a method for a player to participate in hand of a particular card game at a table, the method comprising the player participating in said hand using an access element, the access element being coupled to a gaming system via a network, the gaming system having determined an order in which a group of player-entries that have been assigned to said table participate in said hand of said card game by carrying out a method according to the above third aspect of the invention, said group of player-entries including a player-entry of said player, said player participating in said hand of said particular card game at said table using said player-entry.

According to another aspect of the invention, there is provided a gaming system comprising a processor arranged to carry out any one of the above-described methods.

According to another aspect of the invention, there is provided a computer program which, when executed by a computer, carries out any one of the above-described methods.

BRIEF DESCRIPTION OF THE DRAWINGS

Embodiments of the invention will now be described, by way of example only, with reference to the accompanying drawings, in which.

DETAILED DESCRIPTION OF EMBODIMENTS OF THE INVENTION

In the description that follows and in the figures, certain embodiments of the invention are described. However, it will be appreciated that the invention is not limited to the embodiments that are described and that some embodiments may not include all of the features that are described below. It will be evident, however, that various modifications and changes may be made herein without departing from the broader spirit and scope of the invention as set forth in the appended claims.

Figure 1:
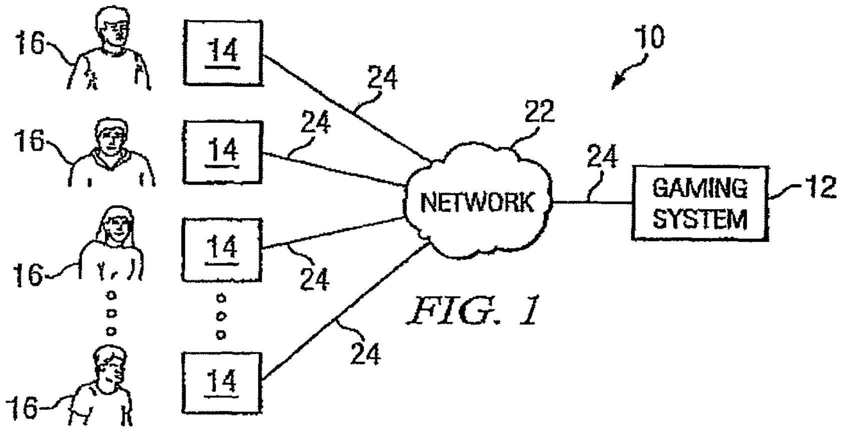
FIG. 1 schematically illustrates a gaming network, in accordance with a particular embodiment of the invention.

FIG. 1 schematically illustrates a gaming network 10, in accordance with a particular embodiment. The gaming network 10 comprises a gaming system 12 and a plurality of access elements 14. The gaming system 12 is coupled to the access elements 14 through a communication network 22. The communication network 22 allows the gaming system 12 and the access elements 14 to communicate with each other through a plurality of communication links 24. In particular embodiments, the gaming system 12 may be provided and maintained by a gaming company or organization. The access elements 14 allow users (or players) 16 to access the gaming system 12 through the communication network 22.

The gaming system 12 provides various games for play by the users 16 accessing the gaming system 12 through the access elements 14. In particular embodiments, these games may include electronic poker games such as Hold 'Em, Omaha, Omaha Hi-Low, Seven Card Stud and Seven Card Stud Hi-Low. It will be appreciated that the gaming system 12 may, additionally or alternatively, provide other electronic card games. The users 16 may play games provided through the gaming system 12 for free, for money or for various other prizes, such as coupons, discounts and merchandise. In some games, a user 16 may bet or wager real money or points or other items with or without monetary value. In the case of wagering and playing for money, a user 16 may deposit money in a money account with the gaming system 12 by cheque, credit card, wire transfer or any other method. Once money is in a player's money account with the gaming system 12, the player 16 may purchase "chips" to be used in a game, up to the amount he has on deposit.

The gaming system 12 may allow a player 16 to play, or participate in, multiple hands of one or more electronic card games simultaneously. For example, a player 16 may play two, three, or more separate hands of Hold 'Em at the same time. Thus, a player 16 may have one or more so-called "player-entries". A player-entry is a representation, occurrence, instance or version of that player 16 within a particular hand of a game, with that player-entry participating in that hand under the control of that player 16. For example, a player 16 may have a first player-entry for playing a first hand of Hold 'Em, a second player-entry for playing a second hand of Hold 'Em different from, and concurrent with, the first hand of Hold 'Em, a third player-entry for playing a third hand of Hold 'Em different from, and concurrent with, the first and second hands of Hold 'Em, and so on, possibly together with one or more other player-entries for different hands of different games. It will be appreciated that, in the above, Hold 'Em has been used merely as an example of a game. The gaming system 12 may arrange for the access device 14 being used by a player 16 to display a separate window (or play area) for each player-entry of that player 16, with a player-entry's participation in a hand of a game being displayed in, and controlled via, its window.

It will be appreciated that in cases where a player 16 has only a single player-entry, or in which the game system 12 allows a player 16 to have at most one player-entry for any particular game, then there is no distinction between a player 16 and his player-entry.

In particular embodiments, a player-entry is moved to, or assigned to, a different table based on the availability of that player-entry in a game. For example, upon folding their cards a player-entry at one table may be moved or assigned (for example, through a queue or directly) to another table to begin a new hand. Therefore, the player 16 of that player-entry may not have to wait until the end of the hand at the table at which that player-entry folded before continuing play in another hand via that player-entry. This functionality helps to reduce collusion by a player or several players, because it inherently separates collusive players who normally sit at the same table. By dispersing player-entries to new tables, players who are partnering or playing two or more seats or player-entries will not be able to consistently play at the same table. As the number of tables increases, the process of seating idle player-entries may create a larger number of active tables, and a player-entry may seamlessly play, or participate in, more hands over an equal timeframe when compared to a conventional game. Given the increased action of multiple active tables in the virtual table format, if the game is a real money game featuring a rake from the pot for the game provider, then more money may be raked as compared to a conventional table format.

In the illustrated embodiment, the communication network 22 enables communication between the access elements 14 and the gaming system 12, all of which may be distributed across multiple cities and geographic regions. The network 22 may comprise one or more of partial wide area networks (WANs), public switched telephone networks (PSTNs), local area networks (LANs), the Internet or any other communications and data exchange networks or systems that enable communication between communication system elements, including public or private wireline or wireless networks. For example, in particular embodiments, some access elements 14 may communicate with the gaming system 12 over the Internet, while other access elements 14 may communicate with the gaming system 12 over a LAN. The network 22 may also comprise any of a number of network components to enable communication between elements as described herein. Such network components may include gate keepers, call managers, routers, hubs, switches, gateways, endpoints or other hardware, software or embedded logic implementing any number of communication protocols that allow for the exchange of data in the gaming network 10. The term "communication network" should be interpreted as generally defining any network capable of transmitting audio and/or video telecommunication signals; data; and/or messages. Generally, the communication network 22 provides for the communication of packets, cells, frames, or other portions or data or information between and among the gaming system 12 and the access elements 14. In particular embodiments, the communication network 22 employs communication protocols that allow for the addressing or identification of access elements, nodes and/or systems coupled to the network 22. For example, using Internet protocol (IP), each of the components coupled together by the communication network 22 may be identified using IP addresses. In this manner, the communication network 22 may support any form and/or combination of point-to-point, multicast, unicast or other techniques for exchanging media data and information among components of the gaming network 10. Any network components capable of exchanging audio, video or other data using frames, packets or otherwise may be included within the scope of particular embodiments.

The access elements 14 may each be associated with one or more respective users (or players) 16 of the gaming system 12. The access elements 14 may include any combination of hardware, software and/or encoded logic that provides communication services to a user 16. For example, the access elements 14 may include a telephone, a computer running telephony software, a video monitor, a personal computer, a camera, an IP phone, a cell phone, a personal digital assistant (PDA), a dedicated gaming console or machine, or any other communication hardware, software and/or encoded logic that supports the communication of data or information with the gaming system 12 through the communication network 22. The access elements 14 may also include unattended or automated systems, gateways, other intermediate components or other devices that can establish media sessions. In particular embodiments, the gaming system 12 provides a website that makes information and programming stored at the gaming system 12 available to the access elements 14—for example, the gaming system 12 may make available, and allow an access element 14 to download, client software for execution at the access element 14 to enable a user 16 of the access element 14 to play a game. Access elements 14 may access from the gaming system 12 information, files and functionality using a Uniform Resource Locator (URL) of the website. The website may include web pages that may comprise text, images, sounds, animations and other information. In particular embodiments, the access elements 14 may operate or execute software that acts as an interface between the users 16 and the gaming system 12. In some cases this software may generally be referred to as "thin" or "dumb" software in situations where management and control of various games resides in the gaming system 12.

The communication links 24 connecting the access elements 14 and the gaming system 12 to the network 22 may comprise any type of communication links capable of supporting data transfer, such as wireline or wireless links. In particular embodiments, the communication links 24 may comprise, alone or in combination, cable links, Digital Subscriber Line (DSL) links, Integrated Services Digital Network (ISDN) links, Asymmetric Digital Subscriber Line (ADSL) links, T1 or T3 communication lines, wireless communication links, hardware lines, telephone links or other suitable types of data communication links. The communication links 24 may also connect to a plurality of intermediate servers or other components between the communication network 22 and the gaming system 12 and between the communication network 22 and the access elements 14.

Figure 2:
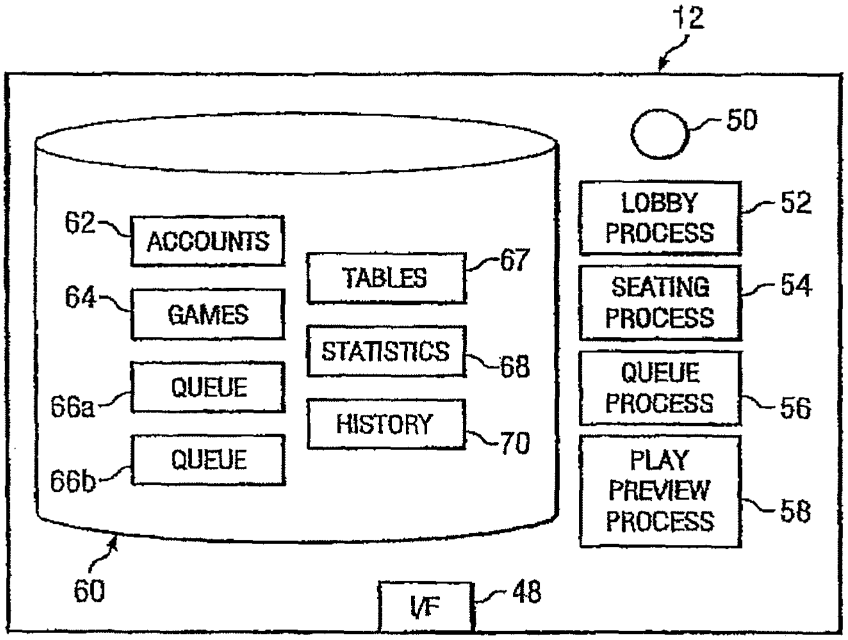
FIG. 2 schematically illustrates a gaming system of FIG. 1, in accordance with a particular embodiment of the invention.

FIG. 2 schematically illustrates the gaming system 12, in accordance with a particular embodiment. The gaming system 12 includes an interface 48, a processor 50, a lobby process 52, a seating process 54, a queue process 56, a play review process 58 and a memory 60. Particular embodiments may include a gaming system 12 have none, some or all of the same or similar components as those described herein to perform various functionality described herein. It will be appreciated that the gaming system 12 illustrated in FIG. 2 may comprise one or more computers (such as server computers) and may therefore comprise one or more interfaces 48 and/or one or more memories 60 and/or one or more processors 50 working together or independently of each other.

The interface 48 couples the gaming system 12 with the communication network 22 and is operable to receive communications from and transmit communications to the communication network 22. The interface 48 may therefore be any suitable network interface.

The processor 50 may be one or more of: a microprocessor, controller, or any other suitable computing device, resource, or combination of hardware, software and/or encoded logic operable to provide, either alone or in conjunction with other components of the gaming system 12, functionality of the gaming system 12. Such functionality may include controlling, managing and providing various features discussed herein to a plurality of users 16, such as users 16 of the access elements 14 accessing the gaming system 12.

The memory 60 may be any form of volatile or non-volatile memory including, without limitation, one or more of: magnetic media, optical media, random access memory (RAM), read-only memory (ROM), removable media, or any other suitable local or remote memory component. The memory 60 may store any suitable data or information, including software and encoded logic, utilized by the gaming system 12. For example, the memory 60 may store an operating system (not shown in FIG. 2) for execution by the processor 50. The memory 60 may store one or more computer programs (not shown in FIG. 2) which, when executed by the processor 50, cause the processor 50 to carry out methods according to embodiments of the invention. In the embodiment illustrated in FIG. 2, the memory 60 includes or stores data for (or relating to) player accounts 62, games 64, queues or lists 66*a* and 66*b*, tables 67, statistics 68 and history 70. Gaming systems 12 in other embodiments may include a memory 60 that includes data for (or relating to) some, none or all of the same or similar components as those described above.

The accounts data 62 generally include information relating to various players 16 who have an account with the gaming system 12. Each player 16 who has registered with the gaming system 12 may have a player account with the gaming system 12, and the accounts data 62 stores data relating to those player accounts. A player account of a player 16 may include information such as: a history of play of that player 16; account balance of that player 16; data relating to a money account of that player 16; data about the or each player-entry of that player 16, e.g., amount of money, chips, points or otherwise of that player-entry, current status (idle or not participating in a hand, actively participating in a hand, paused, etc.), the table (if any) to which that player-entry has been assigned, etc.; profile of the player 16, such as a login name and a password; or any other suitable information.

The games data 64 generally include information associated with electronic card games that may be provided by and through the gaming system 12. Such information may include, for example, gaming software, rules, options, procedures, configurations and other information associated with games provided by the gaming system 12.

The queues or lists 66 generally store data identifying player-entries waiting to join tables associated with games of the gaming system 12, i.e. data identifying player-entries that are not actively participating in a hand of a game and that are not currently assigned to a table for future participation in a hand at a table. The queues 66 may store any suitable information associated with the players-entries in the queues, such as information described below that may be used with various queue and seating process functionality. Particular embodiments may include any suitable number and/or type of queues or lists 66 for various situations. For example, each queue or list 66 may be associated with a particular type of game offered through the gaming system 12. For example, there may be a queue or list 66 for each particular type of game (such as Hold 'Em, Omaha, Omaha Hi-Low, Seven Card Stud and Seven Card Stud Hi-Low) and for each configuration of a particular type of game (such as a predetermined or threshold number of player-entries required to play a hand of the game and/or the value of a minimum bet or of a small or big blind of the game and/or whether the game is a no-limit game, a pot-limit game or a fixed-limit game, etc). In some cases, queues 66 comprising idle players waiting to be placed in a table may be referred to as idle player queues. The lists or queues 66 may be ordered in one or more ways, as will be described below in more detail.

Tables data 67 may generally include information associated with various tables of various games. For example, such information may identify the number of tables, the identities of the current player-entries that have been assigned to the respective tables, game status information of tables (e.g. is a table "active" in that player-entries are currently actively participating in a game or is a table "inactive" in that currently an insufficient number of player-entries have been assigned to that table in order for a hand of the game associated with that table to be played), table betting parameters and any other suitable information to provide the functionality described herein.

The statistics 68 generally includes statistical information kept by the gaming system 12, such as game statistics, player statistics, player-entry statistics, situational statistics related to games and/or players and/or player-entries in various situations and any other suitable statistical information. The statistics 68 may keep detailed player statistics that help define a player's skill level, such as statistics regarding a player's aggressiveness, folding percentage and raise percentage. In some embodiments statistics for a particular player or player-entry may be made available to other players either during or outside of a particular game.

The history data 70 generally includes historical information associated with the gaming system 12, such as game history, player history, player-entry history, recorded games and recorded hands or situations.

The lobby process 52, seating process 54, queue process 56 and play review process 58 may comprise suitable hardware, software or encoded logic processes, algorithms or methods for execution by the gaming system 12 (e.g. by the processor 50 of the gaming system 12). Gaming systems in other embodiments may provide similar or different processes to execute some or all of the functionality described herein.

Various functionality of the gaming system 12 that may be provided in one or more embodiments is described herein. This functionality may be provided for any of a number of suitable electronic card games, such as various poker games and bridge. Particular games which may benefit from embodiments described herein include games involving the participation of multiple player-entries where the play, or turn, progresses serially from one player-entry to a next player-entry, where there may be some idling of players and some intellectual pauses.

In particular embodiments, a user 16 may log-in to the gaming system 12 by keying in a unique login name associated with that user 16 (which may ultimately be displayed at the user's selected seat at a table) and a password. The lobby process 52 may check the entered login name and password by comparing them with login names and passwords held in the various player accounts in the account data 62—if there is a player account with a matching login name and password, then the lobby process 52 may log-in the associated user or player 16; otherwise, the user 16 is not logged-in. A player 16 who has never used the gaming system 12 before may be required to go through a registration process in order to have an associated player account set up.

In particular embodiments, as further discussed below, to control the seating of a player-entry, a "projected-next-seat-number" variable or indicator may be associated with the player-entry—this may be stored, for example, within the account data 62 as data associated with that player-entry in the player account for that player 16. When a new player-entry is created or instantiated for a particular game such as Hold 'Em, the lobby process 52 may set the "projected-next-seat-number" of that player-entry to indicate the big blind, or seat number two, to influence the seating algorithm such that it may cause a new player-entry to play the big blind.

Alternatively, in particular embodiments, as further discussed below, to control the seating of a player-entry, a "number-of-hands-since-last-played" variable or indicator may be associated with the player-entry—this may be stored, for example, within the account data 62 as data associated with that player-entry in the player account for that player 16. In various games, there is one or more particular roles within that game, such as being a small blind, being a big blind, or being the dealer (or having the button). A player-entry may have an associated "number-of-hands-since-last-played" for the or each particular role within a game. The value of the "number-of-hands-since-last-played" variable for a particular role for a player-entry represents the number of hands in which that player-entry has participated since that player-entry last assumed that particular role. When a new player-entry is created or instantiated for a particular game such as Hold 'Em, the lobby process 52 may set the value of a "number-of-hands-since-last-played" variable for a particular role to a predetermined maximum value for that variable.

After the user 16 has successfully logged in, the lobby process 52 presents the user 16 with an option to choose the type of game he wishes to play, and the user's access element 14 may be connected to the software 64 of the chosen game which causes game information to be displayed at the user's access element 14. This information may be a summary listing the number of tables, players 16 and player-entries involved in that particular game.

In a typical traditional online format, a list of active tables, some of which may have open seats, is displayed and a player 16 would need to select, or go to, a table screen depicting a table having an open seat in order to select an open seat at that table so that that player's player-entry may participate in a hand at that table.

However, in the virtual table format according to embodiments of the invention, a player 16 does not have to do this traditional table/seat selection because the tables are "transient". In particular, when a virtual table game player 16 selects a game to play, a player-entry for that player 16 and for that type of game may be created. One or more further player-entries for that player 16 may be created if the player 16 wishes to participate in multiple hands of that game simultaneously—for example, the access element 14 may display a button to the player 16 which, if selected, causes a new player-entry to be created for that player 16. When a player-entry is created, it may be placed in an idle player queue or list 66 and may then be automatically placed at, or assigned to, a table as described below. In some embodiments, new players 16 may be able to view a table screen before deciding whether to play in that particular type of game. When a player 16 is presented with the table screen, the screen may display player-entries of other players 16 who may be accessing the gaming system 12 through other access elements 14 from, for example, different geographic locations. In some cases, each player-entry may be identified by the respective login name of their associated player 16. There may be an image of a stationary dealer at the table who deals but does not play.

As a particular hand of play begins at a table, the cards may be dealt electronically. A randomizing algorithm may be used to shuffle the cards, so the play may be faster than a normal manual game in which the cards must be physically shuffled. In some embodiments, an active player-entry (i.e. a player-entry that is currently actively participating or playing in the hand at the table) may view or see his cards on a screen of his access element 14. The active player-entries take turns (usually in clockwise display order around the table) to act on the hand (e.g. by checking, folding, calling or raising). A player 16 may immediately decide, based on the cards dealt to his player-entry for this hand, whether to continue play, i.e. whether or not to remain participating in the hand. It is not typical for all players-entries playing a given dealt hand to stay to the end of the hand until a winner is determined. At a point of time after the hand is dealt, a player 16 may determine that he no longer wishes his player-entry to participate in this hand (e.g. if he considers that the cards dealt to his player-entry are insufficient to warrant playing further or if the current bet is too large for him). The player 16 can then exercise an option for his player-entry to no longer play in this hand—this is typically called "folding".

Typically, once a player-entry folds, the associated player 16 must wait until the hand is played out (for example until a winner is determined) and then he may participate (via his player entry) in the next hand at the table. However, in particular embodiments, once a player-entry folds at a given table, the player-entry may be moved to another table (e.g., a new group of player-entries) via a queue 66 or otherwise to participate in, or play, a new hand with the new group of player-entries without the folding player 16 having to wait until the end of the hand at the table at which his player-entry folded before continuing play. The new table may comprise other player-entries that have folded at the same or different tables, player-entries that have finished out a hand at the same or different tables and/or new player-entries just beginning a gaming session. In some cases player-entries such as those who have just folded at a given table may be moved into a queue 66 by queue process 56 to wait until there are enough player-entries in the queue 66 to start a hand at a different table. Players 16 with player-entries in a queue 66 may be allowed to watch a hand at which they just folded while waiting on a new table to form (e.g., while waiting on enough player-entries in the queue 66 to form a new table). When the queue 66 comprises enough player-entries to form a table with a desired (predetermined) number of players for the game associated with that table, the queue process 56 may assign player-entries to that table and display a new table screen for each player 16 showing their player-entry seated with other idled player-entries from the queue 66. As will be described later, the queue process 56 may carry out alternative steps for assigning player-entries to tables.

In particular embodiments, a player 16 with a player-entry in a queue 66 may not be able to see the queue 66 or any information associated with the queue 66, such as the location of their player-entry in the queue 66 and the identification or number of other player-entries in the queue 66.

Figure 3:
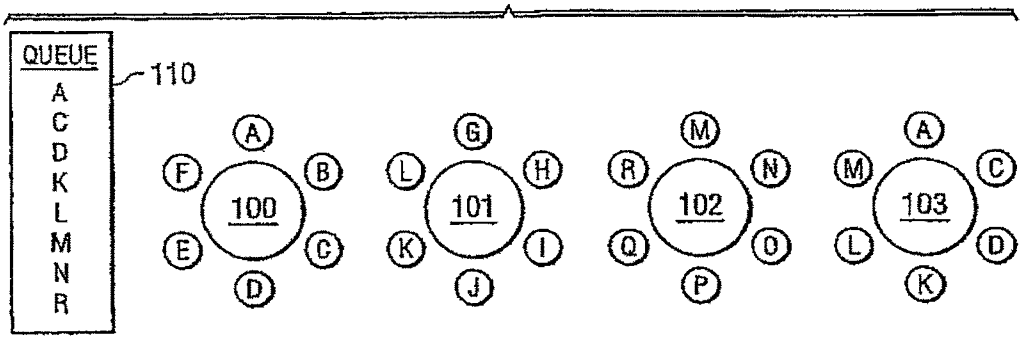
FIG. 3 schematically illustrates example functionality of a queue process, in accordance with a particular embodiment of the invention.

As a general example in operation of queue process 56, FIG. 3 schematically illustrates a plurality of virtual tables 100-103 of the gaming system 12. The tables 100-102 each comprise a collection of player-entries actively playing a given poker game such as those mentioned above. The table 100 includes player-entries A-F, the table 101 includes the player-entries G-L and the table 102 includes player-entries M-R. While six player-entries are illustrated as playing at each table 100-102, it should be understood that tables in various embodiments may include any suitable respective predetermined number of player-entries, and embodiments may include tables having different predetermined numbers of player-entries while still incorporating the functionality described herein.

Assume for this example that hands are dealt at the tables 100-102. At the table 100 player-entries A, C and D fold after reviewing their initial, dealt hand. Player-entries A, C and D may then be placed in a queue 110 to wait on enough additional player-entries to form another table. At the table 101 player-entries K and L fold and are placed in the queue 110. At the table 102 player-entries M, N and R fold and are placed in the queue 110. Each of the above folds may occur at any suitable time, such as when the player-entry's turn to bet arises at the respective table. This folding may occur, for example, at any time during the current hand at the respective table. In some cases it may occur after multiple rounds of betting and after additional cards have been dealt in a hand.

Thus, the queue 110 comprises player-entries A, C, D, K, L, M, N and R. For the purposes of this example, assume that this embodiment operates on a first-in, first-out (FIFO) basis. Therefore, if the player-entries folded and were placed in the queue 110 in the order illustrated (i.e. A, C, D, K, L, M, N and R) then they would be removed from the queue 110 to join another table in that order. When player-entries are pulled from the queue to form a table, their game status may change from idle to active. Assume that a new table formed from those in the queue 110 also needs to comprise, according to the game options, 6 player-entries. As a result, player-entries A, C, D, K, L and M are joined together to play a new hand at the table 103. Player-entries N and R may remain in the queue 110 to wait on enough additional player-entries to join another table.

The remaining player-entries at tables 100, 101 and 102 may play out their respective hands. When a remaining player-entry from any of those tables folds, it may be placed in a queue, such as the queue 110 or a different queue, for joining another group of player-entries to play a new hand. Once the outcomes of the respective hands at tables 100, 101, and 102 are determined, the player-entries remaining at those tables may be joined at their tables by other player-entries from a queue or otherwise to play a new hand or they may be placed into a queue, such as the queue 110, for joining another group of player-entries to play a new hand.

Particular embodiments may utilize any number of tables having any suitable number of players at a given time. For example, with a large number of player-entries utilizing the gaming system 12, a large number of tables may be used. As indicated above, some tables may begin hands with different numbers of player-entries. Particular embodiments may also utilize any number of queues for holding any number of player-entries. Each queue may be designated to hold one or more respective categories of player-entries. In particular embodiments, the number of tables and queues may be set and changed dynamically as the number of player-entries changes in order to provide action that reduces wait time for players 16 so that the action and move to different tables appears almost seamless to the players 16. For example, a player-entry that has just folded or otherwise completed a hand at one table may be moved to a new table. To the associated player 16, the move to the new table may appear almost seamless even though gaming system 12 may have actually placed the player-entry in a queue and pulled the player-entry from the queue for placement at or assignment to the new table according to the queue and seating processes 54, 56 of the gaming system 12. In some cases the gaming system 12 may not notify the player 16 that his player-entry was actually in a queue waiting on a new table to be formed.

In some embodiments the selection of which of a group of different tables to move the player-entry to may be made randomly or using any desired criteria. However, it is clearly desirable to avoid the situation in which a player may have multiple player-entries assigned to the same table, as this would give that player an unfair advantage over other players with player-entries assigned to that table. Hence, the queue process 56 in embodiments of the invention does not assign multiple player-entries of a player to a single table.

Player-entries may be pulled from queues in any desired order, such as FIFO or in another desired manner. For example, player-entries having a higher priority with the gaming system 12 (e.g., as determined by play, bankroll, payment or otherwise) may be pulled from a queue to join a new table before another player-entry having a lower priority. In addition, the pulling of player-entries from queues may be done strategically by the gaming system 12 to achieve desired outcomes (e.g., to speed up or slow down certain players 16). In some cases player-entries may be pulled from the queue in random order.

In some games such as Hold 'Em and other poker games, the location of a player-entry at a table with respect to the "button" is important for a given hand. The button typically rotates one slot around the table for each hand, typically in the same direction as the betting direction. When in a given game a player-entry is identified as a dealer and such identification rotates through the player-entries, the button typically corresponds to the player-entry identified as the dealer. The player-entry to the left of the dealer or button generally bets first for a hand in a given round of betting, and betting typically moves in a clockwise direction. Each round of betting for a given hand proceeds in a similar manner. Thus, the player-entry on the button or dealer's seat typically has an advantage, because that player-entry acts last on a given round of betting, after the other player-entries have taken their turn.

In some games such as "Hold 'Em", seat one, just to the left of the dealer or button, is referred to as the small blind, and seat two, just to the left of seat one, is referred to as the big blind. These blind seats are treated differently from the rest of the seats, because the blinds have to ante before they are dealt their first cards. The player-entries in seats three through the last seat at the table, referred to as the dealer's button, may fold without anteing after they have seen their initial cards. The big blind ante is more of a disadvantage because it is larger than (e.g., normally twice the size of) the small blind ante. In some poker games, when a player 16 plays his first hand, he has to ante the same amount as the big blind. Putting up an ante equal the big blind may be is called "posting," which is similar to an entry fee to the game.

Thus, being situated one spot or two spots to the left of the dealer or button may be a disadvantage for a given hand since player-entries may have to bet without having seen their cards. As suggested above, the further away a player-entry is located from the left of the dealer or button when betting proceeds in a clockwise direction then the greater the advantage for a given hand.

In particular embodiments the seat location with respect to a dealer or button of folding player-entries placed in a queue is associated with those player-entries so that it can be used, for example by seating process 54, when placing the player-entries at a new table. As mentioned above, the memory 60 may store a "projected-next-seat-number" variable or indicator that is associated with a player-entry, or some similar identifier associated with the player-entry in the queue. The memory 60 may also store, for example, a "has-played" variable or similar indicator that is associated with a player-entry to indicate which locations that player-entry has already played (e.g., has played big blind, has played small blind, has played big blind and small blind, etc.). For example, if a player-entry that has just folded from the dealer or button position at a table is placed into a queue 66, then the gaming system 12 may place that player-entry at a new table for a new hand at a location that is just to the left of the dealer or button at the new table. Similarly, a folding play-entry that has just posted the big blind ante before folding at a previous table may be placed at a new table at the small blind location for the next hand. A player-entry may not always be placed at a new table at a location one spot over from the player-entry's previous location at a previous table at which that player-entry just folded. Gaming system 12 may implement any suitable methods, procedures or seating processes for locating folding player-entries at new tables. For example, in some cases the gaming system 12 may utilize circumstances other than a player-entry's previous location at a previous table when determining where to place the player-entry at a new table.

In particular embodiments, to provide continuity from hand to hand, each player's screen display of the current table for one of their player-entries may have the seats rotated so that that player-entry always appears at the same physical location on his table screen. This seat rotation function could be executed at the gaming system 12 like other functionality discussed herein, or at the player's access element 14.

In particular circumstances, situations may arise where several player-entries may be in the queue having the same value for their "projected-next-seat-number" variable. Any suitable method may be used to determine which player-entry is granted or assigned the projected next seat number held by those multiple player-entries. For instance, if several idled player-entries came from seat four at different tables and they were queued to be seated in seat number three, then in some cases a FIFO based seating algorithm may be used. A timestamp associated with the player-entry in the queue may be used to resolve contention issues. For example, if two player-entries have the same "projected-next-seat-number" variable, with other factors being equal, if the seating takes place clockwise from the earliest seats, the player-entry with the earliest timestamp may be assigned the open seat, and the other player-entry may wind up at a subsequently assigned seat. The timestamp may also be used to condition selections, such as to give a new player-entry more of an opportunity to first play the big blind. For instance, setting a new player-entry's timestamp to represent a date several months before the actual game date may cause his entry to be selected prior to already active player-entries.

Particular embodiments may utilize similar or other methods or factors in seating players. An example of one seating process 54 that may be used that includes some of the functionality discussed above follows. For example, when a player-entry folds or finishes an active hand, if the player-entry has finished playing one of the blind seats, a "has-played" variable corresponding to the blind seat played may be set in the player-entry record in that player's player account. If a player-entry has just played the big blind, a "has-played-big-blind" variable of that player-entry will be set. The "has-played-small-blind" variable of a player-entry may be set when seat one is played by that player-entry. These variables may be used to reduce the possibility that a player-entry will replay either blind. These variables may be maintained, for example in memory 60, as components associated with the player account and the queue.

Continuing the example, the gaming system 12 may decrement a projected-next-seat-number variable for a player-entry. If the projected-next-seat-number variable goes to zero, it may be reset to the highest seat number, or the button seat, and any "has-played" variables of that player-entry may be reset. Having the projected-next-seat-number variable set to the button seat represents a restarting of the seating process for the player-entry. When the queue includes a sufficient number of idled player-entries to constitute a new table, an evaluation process may be used to seat the big blind before seating the small blind. Blind selections may be by lowest projected-next-seat-number variable with the earliest timestamp for player-entries who do not have a has-played variable set for the respective blind. As indicated above, having a has-played variable set for a particular location may mean that the player-entry has played or has recently played that location. In a case where all queued player-entries have their has-played-big-blind variable set, the system may have to seat the earliest player-entry regardless.

Continuing the example, after both blinds are seated, a similar evaluation process may be used to seat the button seat signifying that the button holds some seating distinction when compared to the remaining seats. Similar to the has-played blind variables, a has-played-button variable may be associated with a player-entry and this may be used to distinguish if a player-entry has had the opportunity to play the button. The player-entry with the lowest seat number, earliest timestamp and without the has-played-button variable set may be assigned the button seat. The has-played-button variable may be reset when a player-entry's projected-next-seat-number variable becomes the button seat. If all player-entries have already played the button and have their has-played-button variable set, then the player-entry with the highest projected-next-seat-number variable and most current timestamp may be seated at the button seat.

The assignment of the remaining seats, from seat three clockwise to the seat before the button, may be like that of the blinds, using the lowest projected-next-seat-number variable with the earliest timestamp.

As indicated above, some games provided by the gaming system 12 may not have the concept of pre-defined blinds or the button. For example, in seven card stud, all player-entries ante the same amount, and on the first betting round the player-entry with the lowest face card is treated like seat one. The player-entry with the low face card must bet either a small ante or a big ante amount, and then player-entry responses rotate clockwise from his seat. In this case, player-entries may be seated similar to the rules used for non-blind seats, where player-entries are seated clockwise using the lowest projected-next-seat-number variable with the earliest timestamp. Exceptions for the blinds and the button, such as the has-played variables, may not be utilized in some embodiments.

In some traditional games, if a player sits out for a couple of rounds of play, he is not penalized. If he attempts to sit out longer, his chips may be removed from the table, and a new player may be seated in his place. Then, when the first player returns and reenters the game, he has to again post the big blind. In particular embodiments, however, there is no concept of sitting out of a hand, because player-entries that are taking a break (known as paused player-entries) do not appear at a permanent table. Therefore, a returning virtual table player-entry with an existing player account 62 in the memory 60 may be seated just as if it had remained active. That player-entry may not be required to post the big blind because information such as its projected-next-seat-number variable may be stored to be used in seating that player-entry at a new table. In some cases no changes are made to the variables and indicators in the player account, and the lobby process 52 may insert an entry for that player-entry in a queue 66.

Particular embodiments thus provide seating processes and algorithms that are simple, flexible, and robust. Given fair and robust as a general seating criteria, more than one algorithm exists which would yield satisfactory seating results. For example, in particular embodiments for each player-entry a count of how many times that player-entry has played a particular seat may be kept with the timestamp of the last time that player-entry played the seat. Whenever the minimum value of these player-entry seat-counts exceeds zero, they may be reduced by the minimum count so as to base the counts to zero. Then, selecting from high seat to low, the lowest seat count with the earliest timestamp may be used to seat player-entries. This method comprises another fair and robust algorithm that may be used in particular embodiments.

In general, the ability to move folding player-entries into an idle player queue 66 for subsequent placement in, or assignment to, a new table gives designers unique options to use software techniques to enhance the quality of the action. In some cases a player-entry may be allowed to fold out of turn, i.e. before it is that player-entry's next turn to act in that game (by betting, calling, folding or checking in the current betting round). A player-entry that folds out of turn may immediately go into another hand, i.e. be assigned to another table so as to participate in another hand at that table. When a player-entry folds out of turn, that player-entry may be inserted in a queue 66. To avoid other player participating at the old and new tables detecting this, the system may disguise (e.g., at player access elements 14) the player-entry's name or other identifier and money or points amounts at the new table while the player-entry still appears to be active at his prior table, waiting his turn to fold (although that player-entry is no longer participating in that hand). Other methods of avoiding player-entries from detecting out of turn folds are described later.

As an example, if the gaming system 12 is waiting for a response from a player-entry at seat three, if a player-entry in seat nine elected to fold out of turn, the queue process 56 may immediately put that player-entry in a queue 66. From there the player-entry may be assigned a seat at another table. Since the original seat may still appear to be active, to keep player-entries that are viewing multiple different screens from knowing that a particular player-entry has folded early, the early folding player-entry game name and the amount of money or points of that early folding player-entry may be temporarily changed at the new table. Other methods of avoiding player-entries from detecting out of turn folds are described later.

In addition, when a player-entry is moved or assigned to another table (for example, after folding or otherwise completing a hand at a previous table), the player-entry's name or other identity presented for view by other players 16 may change. For example, a player-entry may be playing as "Charlie" at one table and may fold. The gaming system 12 may send or assign the player-entry to another table (for example through a queue process 56 in some cases). At the new table, the gaming system 12 may display another name for the player-entry, such as "Bill" or "Ed" or "Alan". Changing player-entries' display names when they change tables makes it less likely that players 16 can determine the true identity of the player-entry with the changed name. This can reduce the chance that other players 16 can learn another players playing style.

As described herein, particular embodiments provide the positive consequences of seamlessly increasing the action. In particular embodiments when the number of player-entries for a particular game is very small (e.g., between two and four), locating folding player-entries at a new table may be of less benefit. At a level of five players, however, three people could be seated at a new table. As the number of player-entries increases, the number of seats can be ramped up to an optimum number. For example, no-limit Hold 'Em is generally played with nine players-entries. When there are seven player-entries, four could be seated at a table in order to provide the ability to move player-entries to a queue 66 for placement at a different table upon folding. With nine player-entries, five could be seated. At eleven player-entries, six could be seated. This could continue until seventeen player-entries are participating, and then the seating could be set to the maximum of nine. Conversely, when the number of player-entries falls into the low ranges, the maximum seating may be ramped down in order to keep providing the functionality described herein.

The methods discussed herein are ideal for large multi-table tournaments because they may greatly speed up the action. Since some players 16 attempt to play slower in tournaments in order to survive longer, in order to balance out the number of hands played by each player-entry, the gaming system 12 may force faster player-entries to wait for the completion of hands. For example, faster player-entries may have to wait for completion of a hand at their current table upon folding instead of being sent to a queue 66 for placement at a new table. In addition, the faster player-entries may be pulled from an idle player queue 66 more slowly than other player-entries in an effort to slow down the faster player-entries. Slowing down faster player-entries may be used in conjunction with a penalty for slower player-entries. The total amount of money anted as blinds by each player-entry may also be used to help determine which player-entries may need to be slowed down or sped up.

With respect to some games, seating methods discussed herein may reduce the need for certain graphic displays and may simplify a lobby screen. For example, since player-entries at tables may change constantly, there may be no permanent tables to be displayed in some embodiments, and a player-entry does not have to wait and/or contend for a seat at a table. For example, in some embodiments when a player 16 selects a game type, instead of being displayed a list of tables, he may automatically be seated when his player-entry becomes active in the queue 66.

In particular embodiments, players 16 have less of an opportunity to become familiar with the style or characteristics of play of the other players 16 as may be the case with other, traditional games in which players 16 play multiple hands at the same table. Players 16 may not be able to "read" or get "tells" as to whether a player 16 is a good or poor player. They will not have a mental history in order to know if the player 16 is an aggressive bettor or a conservative caller. This will take away a huge advantage of many great players. To reduce the effect of this disadvantage, some embodiments may display information to help define a player's skill level.

As an additional advantage, particular functionality discussed herein allows dealer's choice games to occur more efficiently. Frequently dealer's choice games are played in home poker games. One player may choose to deal Hold 'Em, another player may choose to deal Omaha High and still another player may deal Seven Card Stud. Since the maximum seating for Seven Card Stud is eight players, if the number of players is greater than eight, then Seven Card Stud cannot be dealt without having one player sit out of the hand. The same may be true for traditional online poker games. However, in embodiments discussed herein, the maximum size of the table may not be a restraint allowing a "dealer" player-entry to choose any suitable game. Since gaming system 12 may control the seating of player-entries (for example, from a queue 66), player-entries may be seated at various sized seating arrangements to satisfy a particular requirement for a game chosen by a dealer player-entry.

In a related situation, some online poker games seat the same type of game differently. For instance, one site may seat no-limit Hold 'Em with nine player-entries, and another may seat it with ten player-entries. Using the functionality described herein, the gaming system 12 may offer a dealer's choice where the dealer player-entry has the option to establish the seating differently for a particular type of game, such as no-limit Hold 'Em. For example, a player-entry identified as the dealer may select a game to play as well as a number of players for the game. The queue can then fill the table with waiting player-entries according to the number of players preferred by the "dealer".

As indicated above, the gaming system 12 may keep game and player records and history. The play review process 58 allows a player 16 to go back and see how one or more particular hands were played. These hands may include hands that the player 16 was involved in or hands of other players 16. The history data 70 may store data about the relevant game play information to make this possible. A player 16 of a player-entry that just folded or otherwise completed a hand may be allowed to go back and review that hand. In particular embodiments, the gaming system 12 may allow the player 16 to see the cards of all other players 16 in the hand to see their playing style. While allowing a player 16 to view other player's actual play may not be advantageous in traditional card games, the functionality of particular embodiments to move player-entries across tables to play with a multitude of player-entries in a given session may make it less likely that the reviewing player 16 obtains any advantage over the player 16 whose play was reviewed. In some cases the gaming system 12, for example through the queue process 56 and/or the seating process 54, may ensure that player-entries of those two players 16 are not placed at the same table in the future. In addition, changing a player's screen name or identity across sessions or tables also may reduce or eliminate any advantage to be gained by a reviewing player 16 on a player 16 whose hands are reviewed. Moreover, gaming system may associate an alias with a player 16 whose play is being reviewed.

In some cases gaming system 12 may associate a skill level with players whose play is being reviewed. For example, a novice player may desire to view play of a highly skilled or "expert" player. Gaming system 12 may present historical hands played by highly skilled or expert players for view by the novice player.

In some embodiments players 16 may be able to view historical hands played at any point in time. This would be inefficient in games where everyone sits and plays at the same table because the other players 16 at the table may not want to wait while one player 16 is reviewing historical hands. Moving player-entries across tables however enables a player 16 to stop playing and view historical hands or perform other tasks. For example, after folding or otherwise completing a hand a player 16 may elect to review hands or other information provided by gaming system 12 instead of having his player-entry immediately join another table or be placed into a queue 66 to join another table. In some embodiments an active player 12 may be able to review historical hands or other gaming system information while playing, or he may also do this while in a paused state. When a player 12 decides to sit out of a hand and go to the paused state, in some embodiments he will not be shown as "sitting out" at a table because his player-entries will not appear at any tables, and a seat will not be assigned to his player-entries until he returns to the game.

In particular embodiments the gaming system 12 may provide players 16 with the ability to report other players 16 as possibly cheating. Allowing a player 16 to go back and review a hand that was played while viewing each player-entries' cards may facilitate the identification of cheating play on the part of one or more players 16 who were playing the hand. Once the gaming system 12 receives a report of a possible cheating player 16 or incident, it may automatically or through associated personnel review the play to take appropriate action.

Figure 4:
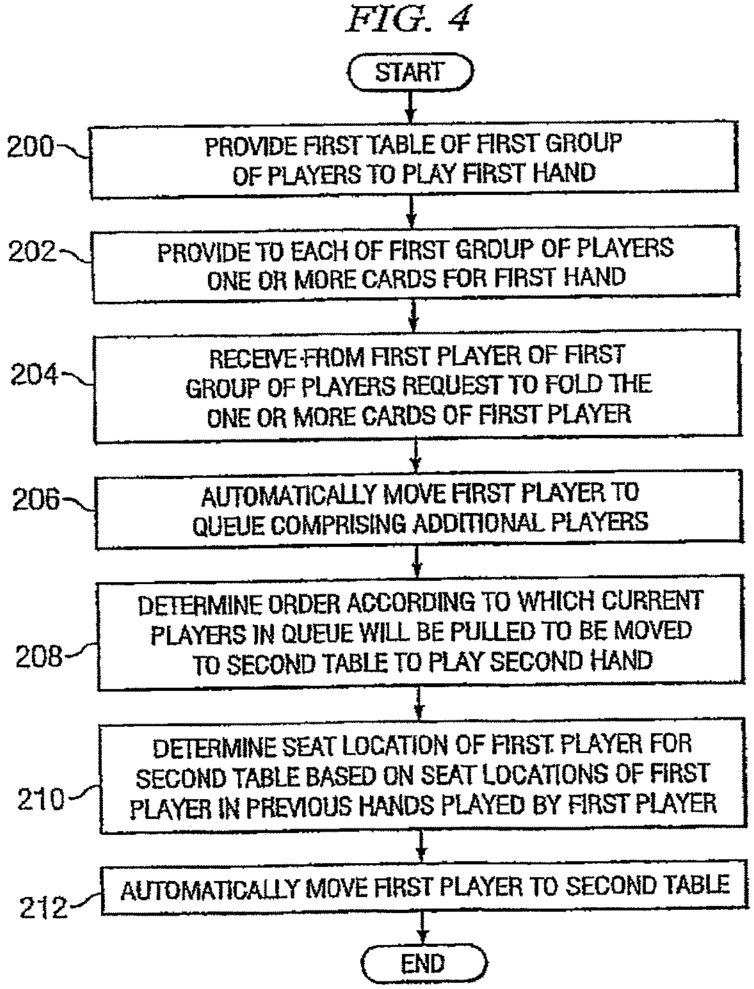
FIG. 4 is a flowchart schematically illustrating a method for computer gaming, in accordance with a particular embodiment of the invention.

FIG. 4 is a flowchart schematically illustrating a method for computer gaming, in accordance with a particular embodiment. The method begins at a step 200 where a first table of a first group of player-entries is provided to play a first hand of a game, such as a poker game. In particular embodiments, each of the players associated with the first group of player-entries may be accessing the gaming system 12 over one or more communication networks 22. At a step 202, one or more cards are provided to each of the first group of player-entries for the first hand. The cards may be dealt by the gaming system 12 randomly in some embodiments.

At a step 204 a request is received from a first player-entry (associated with a first player 16) of the first group of player-entries to fold the one or more cards of the first player-entry. This request may be received, for example, by the first player 16 transmitting a fold request using an access element 14 associated with the first player 16. In some cases the first player 16 may transmit instructions regarding how to play various hands to the gaming system 12 (e.g., before game play in some situations). Thus, the request to fold in various situations may be encompassed in these instructions, and the gaming system 12 may follow these instructions to fold the first player-entry's one or more cards in applicable circumstances. In particular cases the first player-entry may be folding at step 204 well into a hand after one or more rounds of betting, such as after the flop or river card in Hold 'Em.

At a step 206, the first player-entry is automatically moved to a queue 66 comprising additional player-entries. For example, in response to the folding the first player-entry may be moved to a queue 66 so that the first player-entry may be joined with other player-entries at a new table to play a new hand without having to wait on the conclusion of the first hand at the first table. This may be performed without a specific user request at that time to move to a new table. In some cases the gaming system 12 may prompt the first player when the first player-entry folds whether he wants to move the first player-entry to a new table to play a new hand without waiting on the conclusion of the first hand at the first table.

At a step 208, an order is determined according to which current player-entries in the queue 66 will be pulled to move to (or be assigned to) a second table to play a second hand. The determined order may comprise any suitable order, such as a FIFO order. In some cases, player-entries may be pulled according to a priority associated with gaming system 12 (e.g., higher wagering player-entries may be pulled first). In some cases player-entries may be pulled according to seat location. For example, if it is desired that a given player-entry sits at a particular location at a new table, then that player-entry may be pulled to sit at such location at the new table before another player-entry who is associated with a next seat location that has already been assigned at the new table.

At a step 210, the seat location of the first player-entry for the second table is determined based on seat locations of the first player-entry in previous hands played. For example, if the first player-entry just played at the big blind spot in Hold 'Em at the first table, then the seat location for the first player-entry at the second table may be determined to exclude the big blind spot.

At a step 212, the first player-entry is automatically moved from the queue 66 to the second table to play the second hand. One or more other player-entries at the second table may be different from those player-entries that were at the first table with the first player-entry. The movement to the second table may occur without specific user request at that time. In some cases, the first player 16 may not even know that the first player-entry spent time in the queue 66. In addition, this movement from the first table to the second table may appear seamless.

Some of the steps illustrated in the flowchart of FIG. 4 may be combined, modified or deleted where appropriate, and additional steps may also be added to the flowchart.

Additionally, steps may be performed in any suitable order without departing from the scope of the invention.

Figure 5:
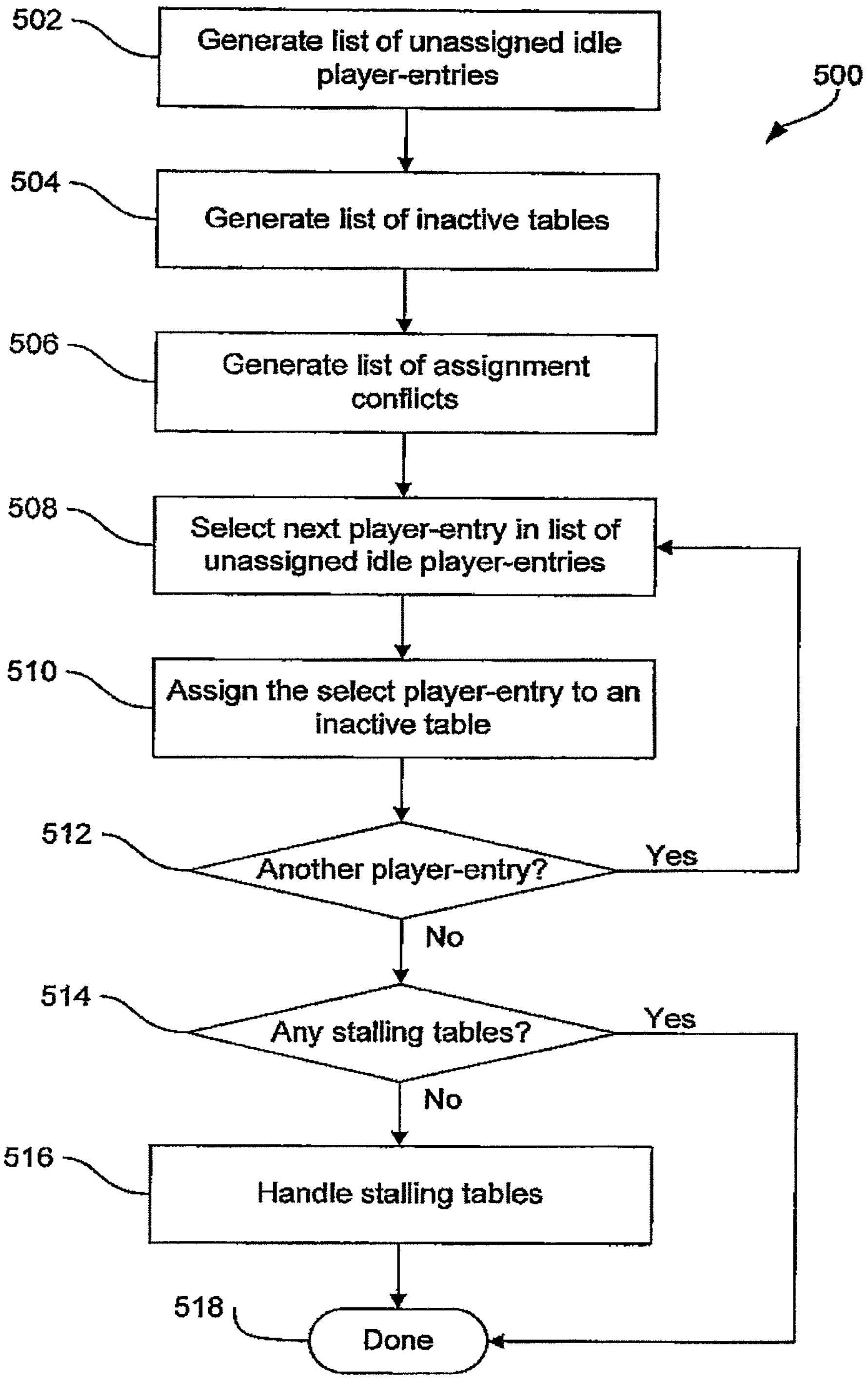
FIG. 5 is a flowchart schematically illustrating a task for assigning player-entries that are not currently assigned to a table to respective inactive tables according to an embodiment of the invention.
Figure 6:
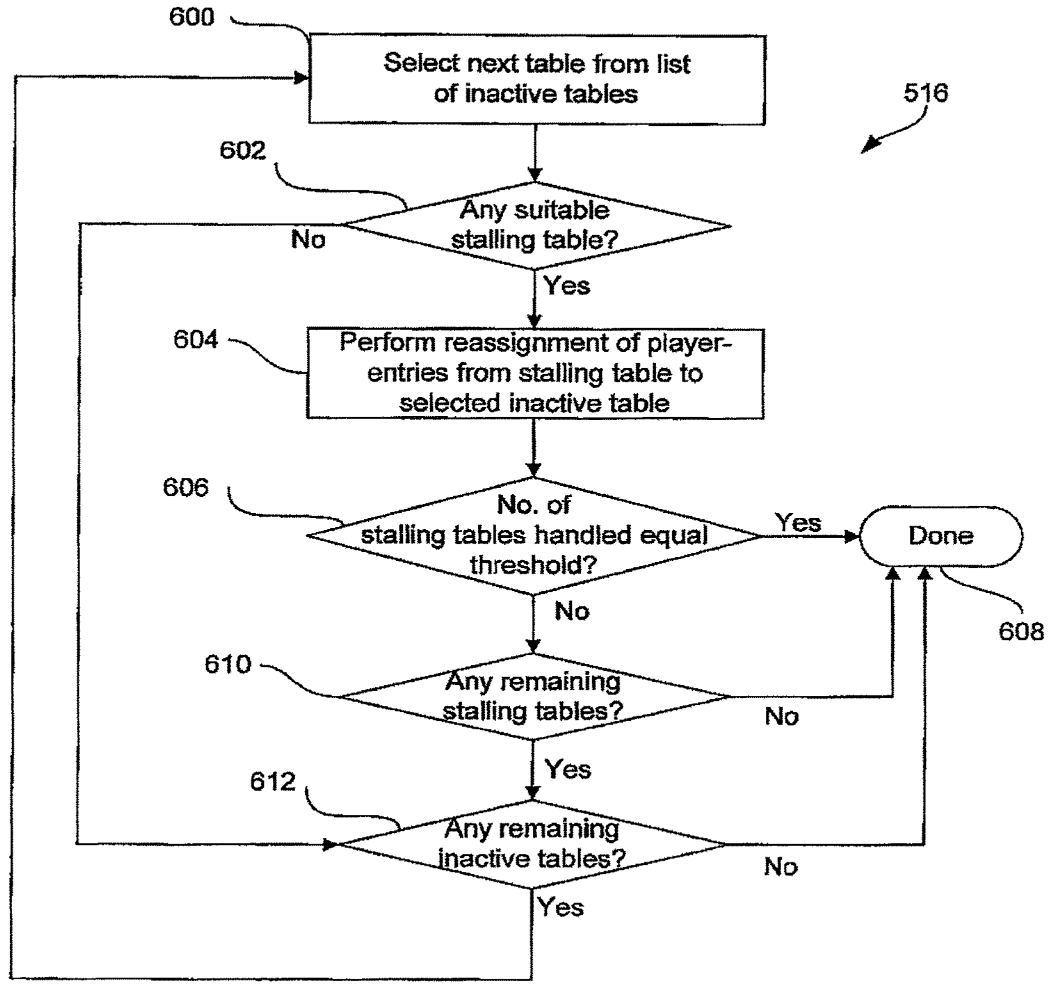
FIG. 6 is a flowchart schematically illustrating the processing performed when the task of FIG. 5 has identified that there is a stalling table according to an embodiment of the invention.

Described below with reference to FIGS. 5 and 6 is a preferred embodiment for assigning (or allocating or moving) player-entries of a plurality of players to respective tables from a plurality of tables, i.e. for selecting which player-entries should participate in a hand of a game at a particular table. This embodiment is particularly suited to electronic card games in which a player-entry that is actively participating in a hand of the game may fold out of turn from that hand so as to no longer be actively participating in that hand (as has been described above). A few preliminary observations are worth making first, though.

A game may be defined by both (a) a game genre or class (such as Hold 'Em, Omaha, Omaha Hi-Low, Seven Card Stud and Seven Card Stud Hi-Low), which may also include, for example, the rules of the game and (b) a game configuration (or options set for that game), such as the number of player-entries required for participating in a hand of that game, the values of any blinds used in that game, whether that game is a no-limit game, a pot-limit game, or a fixed-limit game, etc.

The gaming system 12 may make available one or more types of game, so that a player can choose the type of game he wishes to participate in (e.g. via the lobby process 52 as has been described above). The gaming system 12 makes available one or more tables associated with each type of game. A player 16 wishing to participate in a hand of a particular card game may then have a player-entry assigned to a table associated with that particular card game so that that player-entry can participate in a hand of that particular card game at that table. When that table has the sufficient/required number of player-entries assigned for participating in a hand of that particular card game (i.e. a threshold number of player-entries as may be specified by the game configuration/options), then the gaming system 12 makes that table an "active table", so that the group of those assigned player-entries then actively participate in a hand of that particular card game at that table.

A table that is not an active table is an "inactive table". The gaming system 12 may make an active table inactive when the hand being played at that table comes to a conclusion—any player-entries still assigned to that table at the conclusion of the hand are then no longer assigned to that table. An inactive table may have zero or more player-entries assigned to it, but will have fewer than the threshold number of player-entries required for participating in a hand of the card game associated with that table.

A player-entry is initially assigned to an inactive table. A player-entry that has been assigned to an inactive table is, in general, an "idle" player-entry (i.e. that player-entry is not currently actively participating in a hand, but would like to be participating in a hand). However, it is worth noting that a player-entry may be idle but may currently not be assigned to a table, for example if that player-entry has just folded from a hand, or if the hand in which that player-entry has been participating has just come to a conclusion. A player-entry may be "paused" (instead of being "idle") if that player-entry is not currently actively participating in a hand and the player 16 associated with that player-entry would not like that player-entry to be participating in a hand (e.g. if that player 16 would like to take a break or would like to review play history instead of playing a hand). Naturally, the methods described below only try to assign idle player-entries and do not try to assign paused player-entries.

FIG. 5 is a flowchart schematically illustrating the steps of a task 500 for assigning player-entries that are not currently assigned to a table to respective inactive tables. This task 500 may be performed by the queue process 56 (which may also be referred to as an "assignment process") executing on the gaming system 12. The queue process 56 may perform the task 500 separately for the or each particular type of game currently being supported by and provided by the gaming system 12, so that the task 500 performed for a particular type game is performed with respect to (a) player-entries wishing to participate in a hand of that particular type of game and (b) one or more tables associated with that particular type of game. In one embodiment, the assignment process performs the task(s) 500 periodically, such as at every time-point in a series or sequence of time-points. These time-points may be separated by a predetermined time interval, such as 100 ms, so that the assignment process carries out the task(s) 500 every 100 ms. Thus, the gaming system 12 may comprise a clock which the assignment process monitors to detect when a next time-point has occurred so that it can carry out the task(s) 500. It will be appreciated that other predetermined time intervals may be used instead. Hence, the assignment process attempts, at each time-point (e.g. every 100 ms) to assign currently unassigned player-entries to respective inactive tables.

A task 500 begins at a step 502 at which a list of currently unassigned idle player-entries is determined. There will be a plurality of players 16, each having one or more respective player-entries for participating in a respective hand of the card game associated with the present task 500. The list of unassigned idle player-entries determined at the step 502 then identifies each (idle) player-entry of this plurality of player-entries that is not currently assigned to a table.

It will be appreciated that this list may be freshly generated at the step 502. This list may be maintained and updated between the time-points (e.g. when a player-entry ceases to be associated with a table, it may become idle and may be added to the list) so that a current up-to-date list is already available when the task 500 begins (in which case the step 502 may be omitted). The list may be one of the lists/queues 66. Embodiments of the invention may make use of any method for creating and/or maintaining this list of currently unassigned idle player-entries.

In some embodiments, this list of player-entries may be an ordered list so that the task 500 will process the player-entries in this list according to the ordering of the list. Various ordering methods may be used.

The step 502 may therefore involve actively ordering the list of player-entries according to the desired ordering for the list. However, in some embodiments, the generation and/or maintenance and/or updating of the list of player-entries may involve ensuring that a player-entry added to the list is placed at the correct point in the list according to the desired ordering, so that no actual step of actively ordering the list of player-entries is required. Moreover, some embodiments, whilst making use of an ordering for the list of player-entries, may not actively order the list but may simply, at a step 508 to be described below, determine which player-entry should be selected next based on the desired ordering.

In one embodiment, the desired ordering for this list of currently unassigned idle player-entries may be as follows:

(a) ordered firstly, so that player-entries that folded out of turn from the hand in which those player-entries most recently participated occur later in the list (or are to be selected for processing later) than player-entries that did not fold out of turn from the hand in which those player-entries most recently participated; and (b) ordered secondly, based on whether a player-entry is the n-th player entry of the associated player 16.

For example, assume that:

there are four players A, B, C and D;

player A has 3 idle unassigned player-entries A1, A2 and A3 player B has 2 idle unassigned player-entries B1 and B2;

player C has 1 idle unassigned player-entry C1;

player D has 2 idle unassigned player-entries D1 and D2;

player-entries A2, B1 and D2 are the player-entries that folded out of turn from the respective hands in which they most recently participated.

Then the ordering for the list of currently unassigned idle player-entries may be as follows: A1, C1, D1, B2, A3, B1, A2, D2. The use of criteria (a) above helps ensure that player-entries less likely to have fewer assignment constraints with respect to other players 16 or player-entries (see later) are assigned to respective tables first, which will improve the likelihood that a table will have assigned to it the required threshold number of player-entries for participating in a hand of the card game associated with that table, so that it can be completed and become an active table. The use of criteria (b) above helps ensure that players 16 with fewer player-entries are not delayed too long in having their player-entries assigned relative to a player 16 having more player-entries. For example, a player 16 having a single player-entry should not have the assignment of that single player-entry delayed or penalised by trying to first assign multiple player-entries of another player.

At a step 504 a list of currently inactive tables is determined. It will be appreciated that this list may be freshly generated at the step 504 or may be maintained between the time-points (e.g. as player-entries cease to be associated with a table) so that a current up-to-date list is already available when the task 500 begins (in which case the step 504 may be omitted). The list of currently inactive tables may form part of the table data 67. Embodiments of the invention may make use of any method for creating and/or maintaining this list of inactive tables.

In some embodiments, the list of inactive tables may be an ordered list so that the task 500 will process the inactive tables in this list according to the ordering of the list. Various ordering methods may be used.

The step 504 may therefore involve actively ordering the list of inactive tables. However, in some embodiments, the generation and/or maintenance and/or updating of the list of inactive tables may involve ensuring that an inactive table added to the list is placed at the correct point in the list according to the desired ordering, so that no actual step of actively ordering the list of inactive tables is required. Moreover, some embodiments, whilst making use of an ordering for the list of inactive tables, may not actively order the list but may simply, at a step 510 to be described below, determine which inactive tables should be selected next based on the desired ordering.

In one embodiment, the desired ordering for this list of currently inactive tables is based on the number of player-entries currently assigned to those tables, so that a first inactive table with more assigned player-entries than a second inactive table occurs earlier in the ordering for the list of currently inactive tables than the second inactive table. The desired ordering for this list of currently inactive tables may be based on the number of player-entries that need to be assigned to those tables in order to become active tables, so that a first inactive table needing fewer player-entries to be assigned to it to become active than a second inactive table occurs earlier in the ordering for the list of currently inactive tables than the second inactive table. These two orderings help ensure that a currently inactive table is completed and made active as quickly as possible.

At a step 506, a list of "constraints" is determined or generated. It will be appreciated that if a particular game allows a player-entry that is actively participating in a hand of that game to fold out of turn from that hand so as to no longer be actively participating in that hand, then it is important to make sure that a player 16 with a player-entry still actively participating in that hand does not know of the occurrence of an out of turn fold (as otherwise he may be placed in a position in which he has an unfair advantage over other players 16). Thus, the task 500 caters for situations in which an out of turn fold has occurred. The task 500 therefore aims to maintain the integrity of the game play provided by the gaming system whilst allowing players 16 to play more hands of a game in a given period of time (by virtue of being able to fold out of turn).

As a first example, suppose there is a first table at which two players A and B have respective player-entries A1 and B1 actively participating in a hand at that first table. Suppose that player B also has a second player-entry B2 assigned to a second table. Then, if player-entry A1 folds out of turn, player-entry A1 should not be assigned to that second table, since player B may then be able to deduce (by virtue of seeing player-entry A1 participating in a hand at the second table in which his second player-entry B2 is also participating) that player-entry A1 had folded out of turn. In other words, the assignment of player-entry A1 to the second table could in itself provide player B with additional/further information about the hand in which player-entry B1 is actively participating at the first table, wherein this additional information is information about the hand at the first table that would not be available to player B only by virtue of his first player-entry B1 participating in the hand at the first table. Player B should not be able to deduce anything further about the hand at the first table other than what he could deduce alone by virtue of the participation of player-entry B1 in that hand. Hence, the assignment of player-entry A1 to the second table should be avoided.

For any such situation as this, the list of constraints includes a constraint entry that indicates that an inactive table should not have assigned to it both player-entry A1 and any player-entry of player B or, in one particular embodiment, an entry that indicates that player-entry A1 should not be assigned to a table to which any player-entry of player B is currently assigned.

As a second example, suppose that there is a first table at which two players A and B have respective player-entries A1 and B1 actively participating in a hand at that first table. Suppose that player-entry A1 folds out of turn and is then assigned to a second (inactive) table. Suppose also that player B has an idle unassigned second player-entry B2. Then B2 should not be assigned to the second table, since player B may then be able to deduce (by virtue of seeing player-entry A1 participating in a hand at the second table in which his second player-entry B2 is also participating) that player-entry A1 has folded out of turn. In other words, the assignment of player-entry B2 to the second table could in itself provide player B with additional/further information about the hand in which player-entry B1 is actively participating at the first table, wherein this additional information is information about the hand at the first table that would not be available to player B only by virtue of his first player-entry B1 participating in the hand at the first table. Player B should not be able to deduce anything further about the hand at the first table other than what he could deduce alone by virtue of the participation of player-entry B1 in that hand. Hence, the assignment of player-entry B2 to the second table should be avoided.

For any such situation as this, the list of constraints includes a constraint entry that indicates that an inactive table should not have assigned to it both player-entry A1 and any player-entry of player B or, in one particular embodiment, an entry that indicates that no player-entry of player B may be assigned to a table to which player-entry A1 is currently assigned.

Hence, at the step 506, a list of constraints on the assignment of any currently unassigned (and idle) player-entries is generated. This is done prior to the subsequent steps 508 and 510 at which a suitable table is identified for a selected player-entry and at which that selected player-entry is assigned to that identified table. This provides an advantage in terms of reducing the processing time required to carry out the task 500 as all of the constraints on player-entry assignment are determined once at the outset of the task 500 and do not need to be regenerated for multiple player-entries and/or multiple tables. It will be appreciated, though, that in some embodiments of the invention, the step 506 may be omitted.

At a step 508, a next player-entry (or, the first time that the step 508 is performed, the first player-entry) from the list of unassigned idle player-entries determined at the step 502 is selected. If this list is ordered or has an associated ordering, then the next player-entry is selected according to that ordering for the list.

At a step 510, the selected player-entry is assigned to one of the inactive tables. In particular, the tables in the inactive table list determined at the step 504 are assessed. If this list is ordered or has an associated ordering, then the tables are assessed sequentially in the ordering for the list.

Assessing a table comprises determining or identifying whether that inactive table is an "assignable table" for the selected player-entry. Here, a table is an "assignable table" for a particular player-entry if the assignment of that particular player-entry to that table cannot itself provide any player with further information about a hand in which an already assigned player-entry of that player is actively participating in addition to information about that hand that is available to that player only by virtue of the participation of that already assigned player-entry in that hand. In other words, a table is an "assignable table" for a particular player-entry if that player-entry may be assigned to that table without compromising the integrity or fairness of the game being provided by the gaming system 12.

To make the assessment of whether an inactive table is an assignable table for the selected player-entry, the list of constraints may be checked to see whether there are any constraint entries in the list of constraints that would prohibit the assignment of the selected player-entry to that table—if there are no such prohibiting constraint entries then that table is an assignable table for the selected player entry; otherwise, that table is not an assignable table for the selected player entry.

Identifying whether an inactive table is an assignable table for the selected player-entry may therefore involve: if that selected player-entry folded out of turn from the hand that that selected player-entry most recently participated in, determining that a particular table is not an assignable table for the selected player-entry if there is a second player that has a player-entry still actively participating in the hand that the selected player-entry most recently participated in and that also has a player-entry assigned to that particular table.

Identifying whether an inactive table is an assignable table for the selected player-entry may therefore additionally or alternatively involve: if there is a particular table to which a further player-entry has been assigned and this further player-entry folded out of turn from the hand that the further player-entry most recently participated in, determining that this particular table is not an assignable table for the selected player-entry if the player of the selected player-entry also has a second player-entry still actively participating in the hand that the further player-entry most recently participated in.

If it is determined that the inactive table currently being assessed is not an assignable table for the selected player-entry, then the step 510 moves on to assess the next inactive table in the list of inactive tables—if no such next inactive table exists then a new inactive table is created (having no currently assigned player-entries) and the selected player-entry is assigned to that newly created inactive table. If it is determined that the inactive table currently being assessed is an assignable table for the selected player-entry, then the step 510 assigns the selected player-entry to that table—if that table then has assigned to it the number of player-entries required for participating in a hand at that table, then that table is made active and is removed from the list of inactive tables.

The above determination steps may be based on, or use, the table of constraints generated at the step 506. If this step 506 is omitted, then the above determination steps may be carried out by checking for any such assignment constraints whenever a table has to be assessed for a selected player-entry.

Once an assignable table has been identified for the selected player-entry, then that player-entry is assigned to the identified assignable table. If none of the currently inactive tables is an assignable table for the selected player-entry, then the assignment process may add or create a new table for playing the game associated with the current task 500. This newly created table will initially have no player-entries assigned to it and may therefore be added to the list of inactive tables. This newly created table may then be identified as the table to which the selected player-entry should be assigned, with the selected player-entry then being assigned to that newly created table.

At a step 512, it is determined whether or not there is another player-entry in the list of unassigned player-entries. If there is another player-entry in the list of unassigned player-entries, then processing returns to the step 508; otherwise, processing may either continue at an optional step 514, or may terminate at a step 516.

At the optional step 514, it is determined whether any of the inactive tables is a so-called "stalling table". A stalling table is an inactive table that has been inactive (i.e. has had assigned to it fewer than the threshold number of player-entries required for participating in a hand of the card game at that table) for at least a predetermined number of most recent time-points. In other words, a stalling table is an inactive table that has remained inactive or incomplete for a threshold period of time. If there is a stalling table then processing continues at a step 516 after which the task 500 terminates at the step 518; otherwise, the task 500 terminates at the step 518.

FIG. 6 is a flowchart schematically illustrating the processing for the step 516 of FIG. 5, i.e. the processing performed when the task 500 has identified that there is a stalling table. A stalling table may arise when the player-entries currently assigned to that table have together caused a sufficient number of entries to be placed in the constraints list to make assigning another player-entry to that table difficult or unlikely. The processing at the step 516 therefore attempts to redistribute or reassign some of the player-entries that have been assigned to a stalling table in an attempt to make assigning other player-entries to that stalling table more likely in the future (i.e. so that it is more likely that that table will be completed and will become active).

The processing at the step 516 may attempt to perform this redistribution/reassignment for at most a predetermined number of stalling tables. In a preferred embodiment, this predetermined number is one stalling table, but it will be appreciated that other predetermined numbers may be used based on the frequency at which inactive tables become stalling tables for a particular game and with the current set of player-entries for that game. For example, with a small number of players each having a large number of player-entries, the likelihood of a table stalling is greater than when there is a large number of players each having a small number of player-entries (even if the total number of player-entries is the same or less).

At a step 600, a table from the list of inactive tables is selected. If this list is ordered or has an associated ordering, then the tables are selected sequentially in the ordering for the list. Suppose that this selected table requires a further N player-entries to be assigned to it in order for it to have the required number of player-entries assigned to participate in a hand of the game (i.e. to become active)—here, N is a positive integer. The ordering imposed on the list of inactive tables may (as mentioned above) be an ordering based on increasing size of N, so that the first table selected at the step 600 will be one with the smallest value of N. This has the advantage that completion of that table is more likely as it needs fewer further player-entries to be reassigned to it from a stalling table, thereby making it more likely that a stalling table can be assisted.

At a step 602, it is determined whether there is a different inactive table that is a stalling table that has N (or more) assigned player-entries such that the inactive table selected at the step 600 is an assignable table for each of those N (or more) assigned player-entries. The stalling tables may be checked sequentially based on the ordering used for the list of inactive tables.

If a suitable stalling table is located at the step 602, then processing continues at a step 604; otherwise, processing continues at a step 612.

At the step 612, it is determined whether there are any more inactive tables in the list of inactive tables that have not yet been selected at the step 600. If there are more inactive tables, then processing returns to the step 600 at which a next inactive table is selected; otherwise, processing for the step 516 terminates at a step 608.

At the step 604, N of the N (or more) player-entries assigned to the identified stalling table for which the table selected at the step 600 is an assignable table are reassigned to the table selected at the step 600—i.e. those N player-entries are assigned to the table selected at the step 600 instead of being assigned to the stalling table identified at the step 602. In this way, the table selected at the step 600 will have the required number of player-entries assigned for participating in a hand at that table, and hence will become active and may be removed from the list of inactive tables. Additionally, the stalling table selected at the step 602 will have fewer assignment constraints associated with it (due to having fewer player-entries assigned to it) and hence it is more likely that this table may be completed in the future.

Then, at a step 606, it is determined whether the number of stalling tables for which reassignment has now been performed for this instance of the step 516 is equal to the predetermined number of stalling tables. If reassignment from fewer than the predetermined number of stalling tables has occurred so far, then processing continues at a step 610; otherwise processing for the step 516 terminates at the step 608.

At the step 610, it is determined whether there are any more stalling tables. If there are more stalling tables, then processing continues at the step 612; otherwise, processing for the step 514 terminates at the step 608.

In one embodiment of the invention, the gaming system 12 allows a player to view only those hands in which a player-entry of that player was, or is currently, actively participating.

A method of seating player-entries at a table (i.e. for determining the order in which the group of player-entries assigned to a table take their turns in a hand at that table) of a preferred embodiment of the invention shall be described below with reference to FIGS. 7*a* and 7*b*. This method is applicable to games in which the order that player-entries take their respective turns in a hand of that game is based, at least in part, on which player-entry assumes a particular role in that hand (such as which player-entry acts as the big blind or the small blind if blinds are being played, or which player-entry has the dealer button). The player-entry with the dealer button normally takes a turn after all of the other player-entries have taken their turn. The player-entry playing or assuming the role of the small blind normally takes the first turn in a round of betting for the game (which includes anteing the small blind amount for the first betting round). The player-entry playing or assuming the role of the big blind normally takes the second turn in a round of betting for the game (which includes anteing the big blind amount for the first betting round).

Figure 7A:
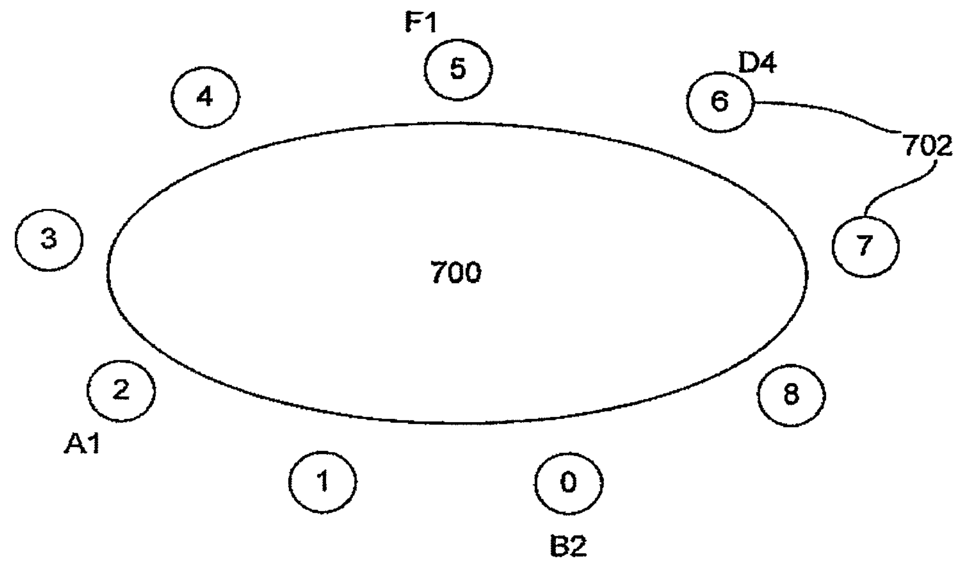
FIGS. 7*a* and 7*b* schematically illustrate example tables with player-entries and seating orders.

FIG. 7*a* schematically illustrates an inactive table 700 for which the threshold number of assigned player-entries that are required for participating in a hand is 9 (although it will be appreciated that this is merely an example number). There are a number of seats (or turn-positions or play-locations) 702 "around" the table 700—they are labelled 0 to 8. The seats 702 are cyclically ordered, so that turns for player-entries cycle from seat 0 to seat 1 to seat 2 to . . . to seat 7 to seat 8 to seat 0 to . . . Each seat is allocatable to a player-entry assigned to the table 700. Thus, the relative order in which the player-entries take their respective turns in a hand of the game is determined by the cyclic ordering for the seats 702 together with which player-entries have been allocated to which seats 702. The cyclic ordering is usually depicted as being clockwise around the table 700. In particular, assuming that play proceeds clockwise around the table 700 and that an actively participating player-entry allocated to seat n (n=0 . . . 8) has just taken a turn in the hand, then the next actively participating player-entry to take a turn in the hand will be the one allocated to seat (n+x) mod 9, where x is the smallest number for which seat (n+x) mod 9 has allocated to it an actively participating player-entry.

This then raises two questions: how are the individual seats 702 initially allocated to player-entries that have been assigned to the table 700 and which player-entry will take the first turn (e.g. make the first bet in a betting round)?

In the example shown in FIG. 7*a*, four player-entries have already been assigned to the table 700. These four player-entries are A1, B2, D4 and F1 where (again) the letter designates a player 16 and the number designates the particular player-entry out of the one or more player-entries of that player 16—however, it will be appreciated that this embodiment may also apply to situations in which a player 16 may have at most one player-entry for a particular type of game. Player-entry A1 has been allocated to seat 2; player-entry B2 has been allocated to seat 0; player-entry D4 has been allocated to seat 6; and player-entry F1 has been allocated to seat 5.

Whenever a player-entry is assigned to the table 700 (e.g. by virtue of assignment at the step 510 or by virtue of reassignment at the step 604), that player-entry is allocated a seat 702 at random from the set of seats 702 that do not currently have a player-entry allocated. For example, if a player-entry G1 were to be assigned to the table 700 as shown in FIG. 7*a*, then that player-entry G1 would be allocated a seat 702 randomly from the set of seats 702 having numbers 1, 3, 4, 7 and 8. In this way, player-entries are distributed randomly around the table 700, so that the relative order in which player-entries take their turns at a table may then be determined randomly. FIG. 7*b* schematically illustrates the active table 700 when it has become active due to having the required number (9) of player-entries assigned to it.

It will be appreciated that the random selection of a seat is not essential—for example, when a player-entry is assigned to the table 700, that player-entry could be allocated to the next available seat 702 in the order of seats 702 starting from seat 0 and progressing to seat 8.

As mentioned above, this method is applicable to games in which the order in which player-entries take their turn in a hand of that game (or a round of a hand of that game) is based, at least in part, on which player-entry assumes a particular role in that hand (such as which player-entry acts as the big blind or the small blind if blinds are being played, or which player-entry has the dealer button). As has been described, the player account data 62 may store and maintain, for each player-entry, an associated variable or counter "number-of-hands-since-last-played" associated with a particular role. The value of this "number-of-hands-since-last-played" counter represents the number of hands in which that player-entry has participated since that player-entry last assumed the corresponding particular role. When a player-entry participates in a hand, then (a) if that player-entry assumes that particular role then the associated "number-of-hands-since-last-played" counter of that player-entry may be reset to 0 by the gaming system 12; (b) if that player-entry does not assume that particular role then the associated "number-of-hands-since-last-played" counter of that player-entry may be incremented by 1 by the gaming system 12.

Figure 7B:
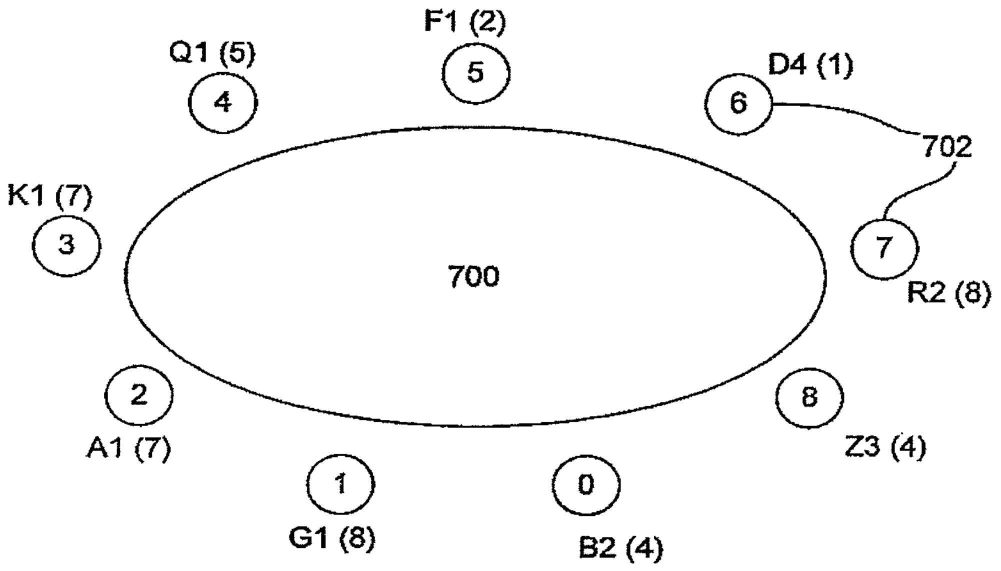

In FIG. 7*b*, the number in parentheses next to the identifier of each player-entry represents the value of the "number-of-hands-since-last-played" counter of that player-entry for, say, the role of acting as big blind.

In an embodiment of the invention, when the required number of player-entries for participating in a hand of the game associated with the table 700 have been assigned to the table 700, then the player-entry out of those assigned player-entries that has the highest value for the "number-of-hands-since-last-played" counter associated with the particular role is selected to be the player-entry that assumes that particular role in that hand. If two or more player-entries assigned to the table 700 have the same value for their "number-of-hands-since-last-played" counter for the particular role, then one of them may be selected, such as the one with the lowest seat number. If the seats 702 have been allocated randomly as described above, then this will help ensure that the selection between two or more player-entries assigned to the table 700 that have the same value for the "number-of-hands-since-last-played" counter is inherently random too. Hence, in the example given in FIG. 7*b*, player-entries G1 and R2 both have the highest "number-of-hands-since-last-played" counter values (both are 8), and so player-entry G1, having a lower seat number than player-entry R2, is selected to assume the role of acting as big blind. The "number-of-hands-since-last-played" counter for player-entry G1 will then be reset to 0, whereas the "number-of-hands-since-last-played" counters for the other player-entries participating at the table 700 will be incremented by 1.

Thus, the particular player-entry that will assume the role of playing a big blind in a game may be determined in this manner by using a "number-of-hands-since-last-played" counter for the big blind role for each player-entry. This may then determine which player-entries will assume the role of the small blind and the dealer; alternatively, a similar approach could be used to determine which player-entry should assume the role of the small blind and/or the dealer. These methods then set which player-entry (usually the small blind) will take the first turn in a betting round of a hand of the game. It will be appreciated that "big blind", "small blind" and "dealer" are just example roles for a game and that the assumption of one or more of these or other roles may be determined in a similar manner.

As mentioned above, when a new player-entry is created or instantiated for a particular game such as Hold 'Em, the lobby process 52 may set the value of a "number-of-hands-since-last-played" counter for a particular role to a predetermined maximum value for that counter. This helps bias the seating selection so that the new player-entry is more likely to assume that particular role in a hand as soon as possible.

Figure 8A:
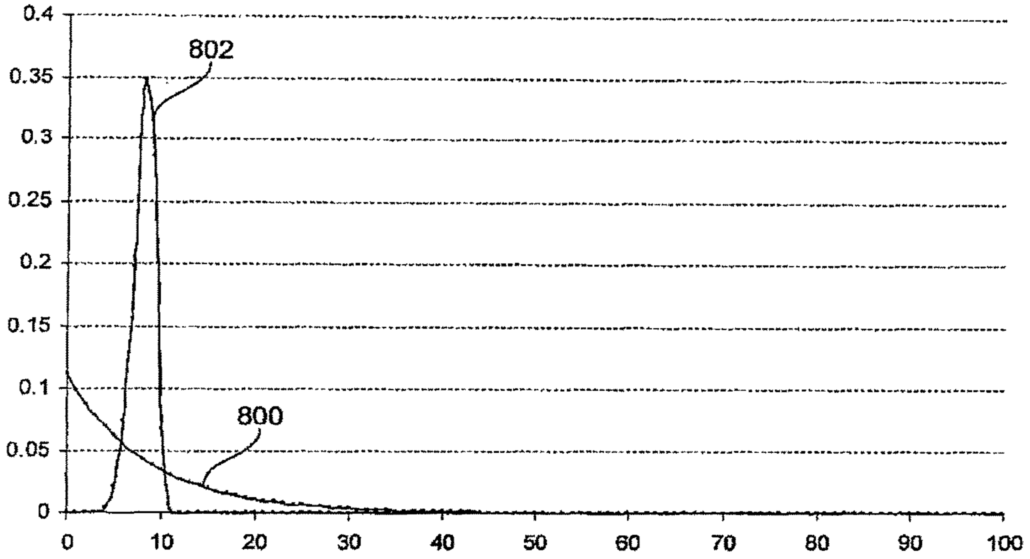
FIG. 8*a* illustrates probability distributions associated with role selection methods.
Figure 8B:
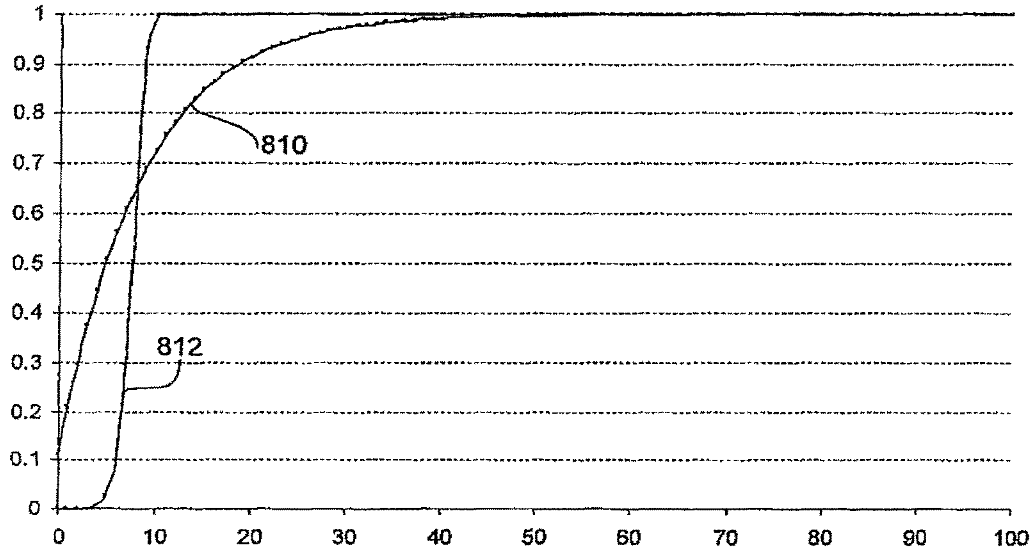
FIG. 8*b* illustrates cumulative probability distributions corresponding to the probability distributions of FIG. 8*a*.

Whilst the allocation of a particular role (e.g. the big blind) to a player-entry could be performed randomly (e.g. by randomly selecting a seat 702 around the table 700) this would result in the possibility that a player-entry may assume that particular role very infrequently over a period of time or may assume that role more frequently than would normally be expected over a period of time. FIG. 8*a* depicts the probability distribution 800 of the number of hands a player-entry would have to play after having just assumed a particular role before assuming that particular role again under the assumption that the particular role is assigned randomly to the player-entries participating in a hand—here it is assumed that 9 player-entries are required for participating in a hand. FIG. 8*b* depicts the corresponding cumulative probability distribution 810. As can be seen, there is a substantial probability that a player-entry will have to wait less than the usual 9 hands before having to assume that particular role—indeed, 50% of the time a player-entry would have to wait 5 hands or less before re-assuming that particular role. For example, the probability that a player-entry would then gave to wait 0 hands before assuming that particular role is 0.11. Similarly, 10% of the time a player-entry would have to wait 20 hands or more before re-assuming that particular role. This is vastly different from what a player would expect—he would expect his player-entry to assume the particular role on a reasonably regular basis, namely about once every 9 hands. Hence, the purely random assignment of a particular role to a player-entry may be considered unsuitable.

In contrast, FIG. 8*a* depicts a probability distribution 802 of the number of hands a player-entry would have to play after having just assumed a particular role before assuming that particular role again under the assumption that the above-described method involving the "number-of-hands-since-last-played" counter is used to assign the particular role to a player-entry. Again, it is assumed that 9 player-entries are required for participating in a hand. FIG. **8*b* depicts the corresponding cumulative probability distribution 812. As can be seen, there is a only a small probability that a player-entry will have to wait less than the usual 9 hands before having to assume that particular role—indeed, a player-entry would have to wait 7 hands or less only about 30% of the time before re-assuming that particular role. Similarly, only 2% of the time would a player-entry have to wait 10 hands or more before re-assuming that particular role. This is much closer to the expectations of players 16**. Hence, the above-described method involving the "number-of-hands-since-last-played" counter is a much more suitable and realistic method of assigning a role to a player-entry.

In some embodiments in which the gaming system 12 provides a game for play by players 16, the gaming system 12 may only enable a player-entry participating in a hand of that game to fold out of turn if there is at least a predetermined number of player-entries associated with (i.e. for playing a hand of) that game and/or at least a predetermined number of distinct players 16 having at least one player-entry associated with (i.e. for participating in a hand of) that game. The predetermined number of distinct players may be set to be equal to twice the number of player-entries required for participating in a single hand of the game. As the number of players and/or player-entries for that game changes, the gaming system 12 may enable or disable the ability to fold out of turn accordingly.

Additionally, or alternatively, in some embodiments in which the gaming system 12 provides a game for play by players 16, the gaming system 12 may only enable a player-entry that has folded from a hand of that game to be assigned to another table before the end of that hand (i.e. without having to wait for that hand to complete or come to a conclusion) if there is at least a predetermined number of player-entries associated with (i.e. for playing a hand of) that game and/or at least a predetermined number of distinct players 16 having at least one player-entry associated with (i.e. for participating in a hand of) that game. The predetermined number of distinct players may be set to be equal to twice the number of player-entries required for participating in a single hand of the game. As the number of players and/or player-entries for that game changes, the gaming system 12 may enable or disable the ability to be assigned to a new table without having to wait for a current hand to end accordingly.

According to an embodiment of the invention, a method of operating an electronic card game tournament may make use of one or more of the above-described methods of enabling and disabling one or both of (a) the ability of a player-entry to fold out of turn and (b) the ability of a player-entry to be assigned to a new table without having to wait for a current hand to end. In particular, at the beginning of the tournament, a player-entry may initially be allowed to fold out of turn from a hand of the game and/or may, having just folded in a hand, be assigned to a new table without having to wait for that hand to end. However, once the number of player-entries and/or distinct players remaining in the tournament (i.e. those who have not exhausted all of their chips) has decreased to a predetermined threshold number of player-entries and/or players, then the ability to fold out of turn may be removed from the remaining player-entries and/or the remaining player-entries will have to wait for the completion of a hand from which they have just folded before being assigned to another table to play another hand. In all other respects, the tournament may be operating in the same way as other electronic card game tournaments.

Operating the tournament in this manner helps bring the tournament to a conclusion as quickly as possible—when there is a large number of player-entries still participating in the tournament, then the rate at which those player-entries participate in hands of the game is increased by virtue of those player-entries (a) being able to fold out of turn and/or (b) being assigned to a new table/hand without having to wait for a hand from which they have just folded to finish. Hence, the time until a player-entry may exit the tournament may be decreased. However, once one of the above predetermined threshold number of distinct players or player-entries has been reached, then these benefits are minimized.

In some embodiments in which the gaming system 12 provides a game for play by players 16, the gaming system 12 may only allow a player to have a multiple player-entries for participating in a hand of that game if there is at least a predetermined number of player-entries associated with (i.e. for playing a hand of) that game and/or at least a predetermined number of distinct players 16 having at least one player-entry associated with (i.e. for participating in a hand of) that game. The predetermined number may be associated with the number of multiple player-entries that a player wishes to have, i.e. there may be a first predetermined number of players and/or player-entries for allowing a player to have a second player-entry, there may be a second (higher) predetermined number of players and/or player-entries for allowing a player to have a third player-entry, and so on. For example: for a player 16 to be allowed to have a second player-entry for a particular game, the gaming system 12 may required there to be at least 18 existing player-entries for that game; for a player 16 to be allowed to have a third player-entry for a particular game, the gaming system 12 may required there to be at least 60 existing player-entries for that game; and for a player 16 to be allowed to have a second player-entry for a particular game, the gaming system 12 may required there to be at least 90 existing player-entries for that game.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within a gaming system, these elements may be combined, rearranged or positioned in order to accommodate particular operational configurations or needs. In addition, any of these elements may be provided as separate external components to the gaming system where appropriate. The present invention contemplates great flexibility in the arrangement of these elements as well as their internal components.

It will be appreciated that, insofar as embodiments of the invention are implemented by a computer program, then a storage medium and a transmission medium carrying the computer program form aspects of the invention. The computer program may have one or more program instructions, or program code, which, when executed by a computer carries out an embodiment of the invention. The term "program," as used herein, may be a sequence of instructions designed for execution on a computer system, and may include a subroutine, a function, a procedure, an object method, an object implementation, an executable application, an applet, a servlet, source code, object code, a shared library, a dynamic linked library, and/or other sequences of instructions designed for execution on a computer system. The storage medium may be a magnetic disc (such as a hard drive or a floppy disc), an optical disc (such as a CD-ROM, a DVD-ROM or a BluRay disc), or a memory (such as a ROM, a RAM, EEPROM, EPROM, Flash memory or a portable/removable memory device), etc. The transmission medium may be a communications signal, a data broadcast, a communications link between two or more computers, etc.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

The invention claimed is:

1. A computer-implemented method for providing an electronic card game, the method comprising:

managing, by a processor, game play at a plurality of virtual tables at which player-entries of a plurality of players are active, wherein individual players may have multiple player-entries each assigned to different virtual tables;

automatically, moving player-entries from their virtual tables to a queue in response to either a request to fold received out of turn from their respective players or when a natural conclusion of game play occurs at their respective tables, wherein the request to fold is received via a communication interface and in response to the request to fold, an associated player-entry is prevented from further participation in game play at its virtual table following the request to fold;

creating, by the processor, a new virtual table;

automatically, moving a first player-entry from the queue to the new table; and iteratively, until a sufficient number of player-entries are moved to the new virtual table, automatically moving an other player-entry to the new virtual table when the new virtual table is a candidate table for assignment of that other player-entry, wherein the new virtual table is disqualified from serving as a candidate table when:

a player associated with the other player-entry and at least one player associated with player-entries previously admitted to the new virtual table have additional player-entries assigned to another virtual table in common; or the player associated with the other player-entry has another player-entry previously admitted to the new virtual table.

2. The method of claim 1, further comprising:

presenting a virtual lobby to the players for selection of virtual games to be played, and selecting initial virtual tables for the players in response to players' selection in the virtual lobby, wherein the moving of player-entries from their virtual tables to the queue and the moving of player-entries from the queue to the new virtual table does not traverse the virtual lobby.

3. The method of claim 1, further comprising, when a sufficient number of player-entries are moved to the new virtual table, assigning the admitted player-entries to positions of the new virtual table according to a fairness policy that considers the player-entries' positions at their prior virtual tables.

4. The method of claim 1, further comprising, in response to the request to fold, disguising the associated player-entry's terminated participation at the respective virtual table.

5. A gaming system comprising a processor configured to:

manage game play at a plurality of virtual tables at which player-entries of a plurality of players are active, wherein individual players may have multiple player-entries each assigned to different virtual tables;

move player-entries from their virtual tables to a queue in response to either a request to fold received out of turn from their respective players or when a natural conclusion of game play occurs at their respective tables, wherein the request to fold is received via a communication interface and in response to the request to fold, an associated player-entry is prevented from further participation in game play at its virtual table following the request to fold;

create a new virtual table;

move a first player-entry from the queue to the new table; and iteratively, until a sufficient number of player-entries are moved to the new virtual table, move an other player-entry to the new virtual table when the new virtual table is a candidate table for assignment of that other player-entry, wherein the new virtual table is disqualified from serving as a candidate table when:

a player associated with the other player-entry and at least one player associated with player-entries previously admitted to the new virtual table have additional player-entries assigned to another virtual table in common; or the player associated with the other player-entry has another player-entry previously admitted to the new virtual table.

6. The system of claim 5, wherein the processor further is configured to:

present a virtual lobby to the players for selection of virtual games to be played, and select initial virtual tables for the players in response to players' selection in the virtual lobby, wherein the movement of player-entries from their virtual tables to the queue and the moving of player-entries from the queue to the new virtual table does not traverse the virtual lobby.

7. The system of claim 5, wherein the processor further is configured to, when a sufficient number of player-entries are moved to the new virtual table, assign the admitted player-entries to positions of the new virtual table according to a fairness policy that considers the player-entries' positions at their prior virtual tables.

8. The system of claim 5, wherein the processor further is configured to, in response to the request to fold, disguise the associated player-entry's terminated participation at the respective virtual table.

9. A computer-readable medium storing a computer program which, when executed by a processor, causes the processor to carry out a method, the method comprising:

manage game play at a plurality of virtual tables at which player-entries of a plurality of players are active, wherein individual players may have multiple player-entries each assigned to different virtual tables;

automatically, move player-entries from their virtual tables to a queue in response to either a request to fold received out of turn from their respective players or when a natural conclusion of game play occurs at their respective tables, wherein the request to fold is received via a communication interface and in response to the request to fold, an associated player-entry is prevented from further participation in game play at its virtual table following the request to fold;

create a new virtual table;

automatically, move a first player-entry from the queue to the new table; and iteratively, until a sufficient number of player-entries are moved to the new virtual table, automatically move an other player-entry to the new virtual table when the new virtual table is a candidate table for assignment of that other player-entry, wherein the new virtual table is disqualified from serving as a candidate table when:

a player associated with the other player-entry and at least one player associated with player-entries previously admitted to the new virtual table have additional player-entries assigned to another virtual table in common; or the player associated with the other player-entry has another player-entry previously admitted to the new virtual table.

10. The medium of claim 9, wherein the computer program further causes the processor to:

present a virtual lobby to the players for selection of virtual games to be played, and select initial virtual tables for the players in response to players' selection in the virtual lobby, wherein the movement of player-entries from their virtual tables to the queue and the moving of player-entries from the queue to the new virtual table does not traverse the virtual lobby.

11. The medium of claim 9, wherein the computer program further causes the processor to, when a sufficient number of player-entries are moved to the new virtual table, assign the admitted player-entries to positions of the new virtual table according to a fairness policy that considers the player-entries' positions at their prior virtual tables.

12. The medium of claim 9, wherein the computer program further causes the processor to, in response to the request to fold, disguise the associated player-entry's terminated participation at the respective virtual table.

* * * * *